United States Patent
Azuma et al.

(10) Patent No.: US 9,314,693 B2
(45) Date of Patent: Apr. 19, 2016

(54) GAME DEVICE

(75) Inventors: Shogo Azuma, Minato-ku (JP);
Hirokatsu Yamaguchi, Minato-ku (JP);
Hiroki Nakasato, Minato-ku (JP);
Kenta Ito, Minato-ku (JP); Takashi Uchiyama, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 115 days.

(21) Appl. No.: 13/983,821

(22) PCT Filed: Feb. 1, 2012

(86) PCT No.: PCT/JP2012/052286
§ 371 (c)(1),
(2), (4) Date: Aug. 6, 2013

(87) PCT Pub. No.: WO2012/111434
PCT Pub. Date: Aug. 23, 2012

(65) Prior Publication Data
US 2013/0316811 A1    Nov. 28, 2013

(30) Foreign Application Priority Data
Feb. 15, 2011 (JP) .................. 2011-030159

(51) Int. Cl.
*A63F 9/24* (2006.01)
*A63F 13/30* (2014.01)
*G07F 17/32* (2006.01)

(52) U.S. Cl.
CPC ............ *A63F 13/12* (2013.01); *G07F 17/3218* (2013.01); *G07F 17/3225* (2013.01); *A63F 2300/204* (2013.01); *A63F 2300/205* (2013.01); *A63F 2300/403* (2013.01); *A63F 2300/405* (2013.01); *A63F 2300/535* (2013.01)

(58) Field of Classification Search
None
See application file for complete search history.

(56) References Cited

U.S. PATENT DOCUMENTS

| | | | |
|---|---|---|---|
| 6,755,742 B1 * | 6/2004 | Hartman et al. | ................. 463/40 |
| 2004/0082383 A1 * | 4/2004 | Muncaster et al. | ............. 463/39 |
| 2007/0149124 A1 | 6/2007 | Onozawa | |
| 2010/0062678 A1 | 3/2010 | Inoue | |

(Continued)

FOREIGN PATENT DOCUMENTS

| | | |
|---|---|---|
| CN | 101600483 A | 12/2009 |
| CN | 101959282 A | 1/2011 |

(Continued)

OTHER PUBLICATIONS

International Search Report of PCT/JP2012/052286 dated May 1, 2012.

(Continued)

*Primary Examiner* — Jason Yen
(74) *Attorney, Agent, or Firm* — Sughrue Mion, PLLC

(57) ABSTRACT

A reference strength (P) is set at a game device (10) as a received signal strength enabling stable communication in a range in which radio waves reach from a wireless relay device (20) (radio wave coverage range), and permits a game play at a portable terminal (30), for which the received signal strength reaches the set reference strength (P). Thus, it is possible to permit players in an area satisfying store manager's wishes to perform remote play under a stable communication environment, without being influenced by a decrease in an effective communication speed.

7 Claims, 14 Drawing Sheets

(56) References Cited

U.S. PATENT DOCUMENTS

| | | | | |
|---|---|---|---|---|
| 2010/0099498 A1* | 4/2010 | Yamada et al. | ............... | 463/42 |
| 2010/0167810 A1* | 7/2010 | Fitzsimons et al. | ............. | 463/25 |
| 2011/0151955 A1* | 6/2011 | Nave | ............................. | 463/2 |

FOREIGN PATENT DOCUMENTS

| | | | | |
|---|---|---|---|---|
| JP | 2006-100957 A | 4/2006 | | |
| JP | 2006-203507 A | 8/2006 | | |
| JP | 2007-158447 A | 6/2007 | | |
| JP | 2008-220598 A | 9/2008 | | |
| WO | WO/2007/100725 | * | 7/2007 | ............... A63F 9/24 |

OTHER PUBLICATIONS

Communication dated Aug. 29, 2014, issued by the State Intellectual Property Office of the People's Republic of China in counterpart Application No. 201280003866.7.

* cited by examiner

FIG. 10

| MAC ADDRESS |
|---|
| XXX |
| YYY |
| ... |
| ABC |

| MAC ADDRESS | NUMBER OF MEDALS |
|---|---|
| XXX | 300 |
| YYY | 70 |
| ... | ... |
| ABC | 150 |

| MAC ADDRESS | NUMBER OF MEDALS | PASSWORD FOR SETTLEMENT |
|---|---|---|
| XXX | 300 | abcde··· |
| YYY | 70 | xyz··· |
| ... | ... | ... |
| ABC | 150 | P0123 |

| MAC ADDRESS | NUMBER OF MEDALS | PASSWORD FOR SETTLEMENT | PROHIBITION FLAG |
|---|---|---|---|
| XXX | 300 | abcde··· | 0 |
| YYY | 70 | xyz··· | 0 |
| ABC | 150 | P0123 | 1 |

L1

| MAC ADDRESS | NUMBER OF MEDALS | PASSWORD FOR SETTLEMENT | PROHIBITION FLAG | PROHIBITION COUNT |
|---|---|---|---|---|
| XXX | 300 | abcde··· | 0 | 0 |
| YYY | 70 | xyz··· | 0 | 3 |
| ABC | 150 | P0123 | 1 | 1 |

L2

GAME DEVICE

TECHNICAL FIELD

The present invention relates to a game device enabling a portable terminal to play a game remotely.

BACKGROUND ART

There has been proposed a game device provided at a game arcade, at which game device a player can play a game by using a portable terminal such as a portable game machine owned by a player and having a wireless LAN function (Patent Document 1). This is realized by enabling wireless communication between the portable terminal and the game device via wireless LAN access points provided in the game arcade.

CITATION LIST

Patent Document

Patent Document 1: Japanese Unexamined Patent Application Publication No. 2008-220598

SUMMARY OF INVENTION

Problems to be Solved by Invention

However, an extent to which radio waves reach from a wireless LAN access point AP provided in the game arcade (radio wave coverage range) does not necessarily correspond to an area where a store manager wishes to permit a player to play the game (hereinafter this will be referred to as a "permitted area"), such as within the game arcade. For example, as shown in FIG. 23, it is assumed that an area where the store manager wishes to permit games to be played using a portable terminal 1 (hereinafter referred to as a "remote play") is within a game arcade site or premises PA. However, if an output strength of the radio wave is set so as to reach the entire site PA, a radio wave coverage range W from the wireless LAN access point AP extends to an area where the store manager does not wish to permit game play by a player, such as outside the game arcade site PA (hereinafter referred to as a "prohibited area"). Thus, a problem arises in that remote play is now possible even outside the area satisfying the store manager's wishes.

On the other hand, if the output strength of the radio wave is limited to keep the radio wave from reaching the prohibited area, as shown in FIG. 24, the radio wave coverage range W is reduced, and there may be many places the radio waves do not reach, even within the area satisfying the store manager's wishes (that is, the site PA). There may be spots in which the radio waves hardly reach physically, for example, spots around an obstacle, spots in a corner, and the like, within the site PA. In this case, remote play is not possible even within the area satisfying the store manager's wishes. Moreover, because effective communication speed decreases at places where the signal strength of the radio signal is low, playing under a stable communication environment is undermined even if remote play is possible.

Thus, it has been difficult for a store manager to set the range in which the remote play is enabled under a stable communication environment. Accordingly, the present invention has as an object to provide a game device at which remote play is possible in a stable communication environment and within an area satisfying a store manager's wishes.

Solution to Problem

Means employed by the present invention to solve the above-described problem will be explained below. In order to facilitate understanding of the present invention, reference signs in the drawings are added in parentheses for convenience, but these reference signs are not intended to limit the present invention to the embodiment in the drawings.

A game device according to the present invention is a game device at which a game play at each of the portable terminals is possible by connecting to a wireless relay device capable of communicating wirelessly with a plurality of portable terminals. The game device has an acquisition unit (Sc101 to Sc105) that acquires a received signal strength corresponding to each of the portable terminals connected wirelessly to the wireless relay device, a determination unit (Sc106 to Sc108) that determines whether or not the received signal strength acquired by the acquisition unit reaches a predetermined reference strength, and a game permission control unit (Sc111 to Sc113) that permits the game play at the portable terminal for which the signal strength is determined to have reached the predetermined reference strength by the determination unit.

According to this game device, the reference strength (−70 [dBm], for example) is set at the game device as the received signal strength (the signal strength of a radio signal) with which stable communication is possible within the range where the radio waves reach from the wireless relay device (radio wave coverage range), and the game device permits the game play corresponding to the portable terminal for which the received signal strength has reached the set reference strength. Thus, it is possible to permit the players in the area satisfying the store manager's wishes to perform the remote play in a stable communication environment, without being affected by a decrease in the effective communication speed. In other words, this means that the game play at the portable terminal is prohibited by the game permission control unit if the signal strength for the portable terminal is determined by the determination unit not to have reached the reference strength. In FIG. 1, for example, the range of a predetermined reference strength (P) is set within a radio wave coverage range (W) from a wireless relay device (20) and within a store area (PA). In this case, the game play at the portable terminal (30) located outside the range of the predetermined reference strength (P) is prohibited. Modes of prohibiting the game play at the portable terminal, for which the signal strength is determined not to have reached the reference strength, may include a configuration prohibiting (i.e., not permitting) the game play immediately and a configuration permitting the game that is already in progress and prohibiting (i.e., not permitting) the game play from the subsequent game. Such a mode is also included so that the game play is prohibited in a case in which predefined conditions are met after it is determined by the determination unit that the signal strength does not reach the reference strength.

For the "predetermined reference strength", the game device may be configured to include a setting unit that sets the predetermined reference strength so that the "predetermined reference strength" can be changed by the store manager and the like. Alternatively, the game device may be configured in such a way that the "predetermined reference strength" is set as an unchangeable fixed value at the time of shipping the game device and the like.

The "portable terminal" is a portable terminal equipped with a wireless LAN device in accordance with, for example, IEEE802.11 series standard, examples of which may include a portable game machine and a smartphone. It is to be noted that any wireless LAN standard may be employed.

The "wireless relay device" is a relay device that connects a portable terminal and a game device to be able to communicate with each other, and may include other functions such as a router, hub and the like. The wireless relay device may be arranged at any location, such as a wall, ceiling and the like of the game arcade. Also, it may be contained in the game device. Furthermore, a plurality of wireless relay devices may be provided with respect to the game device. The plurality of wireless relay devices may be provided, for example, at two locations, that is, one inside the game device and the other at the ceiling of a floor on which the game device is provided, or one on the same floor with the game device (on the first floor, for example) and the other on the different floor (on the second floor, for example). In this case, one of the two permitted areas for the two wireless relay devices may include the other. Furthermore, a plurality of permitted areas corresponding to the plurality of wireless relay devices may partially overlap one another to form a wide permitted area, or the plurality of permitted areas may be adjacent to each other without overlapping one another, or may be separate from each other. When the store manager of the game arcade wishes to cause the game arcade site to become the permitted area, the wireless relay device and the game device corresponding to the remote play are provided at the identical site. Furthermore, the wireless relay device can be used exclusively for one game device, or be shared with a plurality of game devices, or with other services in the game arcade.

The game device according to the present invention may additionally have a connection response unit (Sb207 and Sb208) that transmits a connection response to a connection requesting portable terminal that has transmitted a connection request, out of the respective portable terminals, a connection confirmation reception unit (Sb210) that receives a connection confirmation operation of a player, and a registration unit (Sb211) that registers with a registration list identification information corresponding to the connection requesting portable terminal having received the connection confirmation operation. The game permission control unit (Sc111 to Sc113) may permit the game play at a registered portable terminal for which the identification information is registered with the registration list and for which the signal strength is determined to have reached the predetermined reference strength by the determination unit.

According to this game device, the game device sends the connection response to the portable terminal from which the connection request is received, and registers the portable terminal with the registration list at the discretion of the player owning the portable terminal receiving the connection response. Therefore, complicated procedures, such as inputting of a MAC address as identification information of the portable terminal separately, are not necessary when registering the portable terminal with the registration list.

The game device may further have an input unit that inputs credit information indicating the number of credits consumed in the game play. In this case, the registration unit may register with the registration list the identification information corresponding to the connection requesting portable terminal that has finished inputting the credit information in the input unit. The input unit of the credit information may be configured so as to increase the number of credits according to a number of inserted medals or coins, or may be configured so as to use the credit information stored in a storage medium such as a server, card and the like. Therefore, in a case in which the identification information corresponding to the connection requesting portable terminal that has finished inputting the credit information is registered with the registration list, the state in which the portable terminal is registered with the registration list indicates the state in which the portable terminal owned by the player is associated with the credit information input by the player. It is to be noted that a minimum credit number may be defined when permitting the remote play (game play). For example, when the minimum credit number is defined as "50", it may be configured so that the registration at the registration list is not performed when the credit number does not reach the minimum credit number.

According to another embodiment of the game device of the present invention, the game permission control unit may prohibit the game play at the registered portable terminal, for which the game play once was permitted, in a case in which it is determined by the determination unit that the signal strength of the registered portable terminal does not reach the predetermined reference strength, the prohibiting by assigning disabling information (prohibition flag) to disable the permission of the game play to the identification information corresponding to the registered portable terminal, and the game permission control unit may cancel the disabling information to permit the game play at the registered portable terminal in a case in which it is determined by the determination unit that the signal strength again reaches the predetermined reference strength.

According to this game device, the disabling information is stored for the portable terminal registered with the registration list, the disabling information disabling the permission of the game play and being assigned to the identification information corresponding to the portable terminal for which the signal strength of the radio signal is determined not to have reached the predetermined reference strength. Therefore, switching permission and prohibition of the game play of the portable terminal can be made while maintaining the registration of the portable terminal in the registration list, by updating the maintained disabling information. As it is not necessary to delete the portable terminal from the registration list in order to disable the permission of the game play, the repeated registration procedures are not required even if the permission of the game play is temporarily disabled.

Furthermore, according to still another embodiment of the game device of the present invention, the wireless relay device may be formed by a plurality of separate wireless relay devices; the game device may be capable of establishing a communication connection with the plurality of separate wireless relay devices; and the predetermined reference strength may be separately set for each of the plurality of separate wireless relay devices.

According to this game device, the plurality of wireless relay devices are provided, and the reference strength can be set separately for each of the wireless relay devices. This makes it possible to set the permitted area according to size and shape of the area satisfying the store manager's wishes, while reducing the locations where the radio waves do not reach.

According to another embodiment of the game device of the present invention, in a case in which an instruction for the game play is received from a portable terminal for which the game play is not permitted, the game permission control unit notifies the portable terminal that the game play is not permitted. The "instruction on the game play" includes, for example, operation information of the game by the player, and a request for updating a progress status of the game to be displayed on the portable terminal.

According to this game device, the notice is sent to the portable terminal of the player to the effect that the remote play is not permitted at the location where the signal strength does not reach the reference strength even though the radio waves reach to the location. This makes it possible to encourage the player to move into an effective area.

Furthermore, according to still another embodiment of the game device of the present invention, for a portable terminal that is progressing the game play, the determination unit may perform the determination with a lower limit reference strength for which the signal strength is set lower than the predetermined reference strength instead of with the predetermined reference strength.

According to this game device, the determination is made based on the lower limit reference strength (−80 [dBm], for example) instead of the reference strength (−70 [dBm], for example) even when the received signal strength decreases temporarily during the remote play. Thus, it is possible to continue the remote play without an interruption even when the radio waves weaken due to temporary radio wave interference or noise generation. It is to be noted that the lower limit reference strength may be fixed in relation to the set reference strength (i.e., a value lower than the reference strength by the predetermined value, for example, "(reference strength −10) [dBm]"). Alternatively, the lower limit reference strength may be set independently, similarly to the reference strength.

According to another embodiment of the game device of the present invention, the game permission control unit may be configured so as not to permit progress of the game play in a case in which it is determined by the determination unit that the signal strength does not reach the predetermined reference strength over a plurality of times for a portable terminal that is progressing the game play.

According to this game device, the game play is not permitted in a case in which it is determined that the received signal strength does not reach the reference strength over the plurality of times. This makes it possible to continue the remote play without an interruption even when the radio waves weaken due to the temporary radio wave interference or noise generation.

BRIEF DESCRIPTION OF THE DRAWINGS

FIG. 10 is an explanatory diagram showing addition of identification information to the remote play terminal list according to the present embodiment.

FIG. 11 is an explanatory diagram showing the storing of a number of medals in the remote play terminal list according to the present embodiment.

FIG. 12 is an explanatory diagram showing the storing of a password for settlement in the remote play terminal list according to the present embodiment.

FIG. 14 is an explanatory diagram showing an update of a prohibition flag in the remote play terminal list according to the present embodiment.

BEST MODE FOR CARRYING OUT THE INVENTION

A. Embodiment

Figure 1:
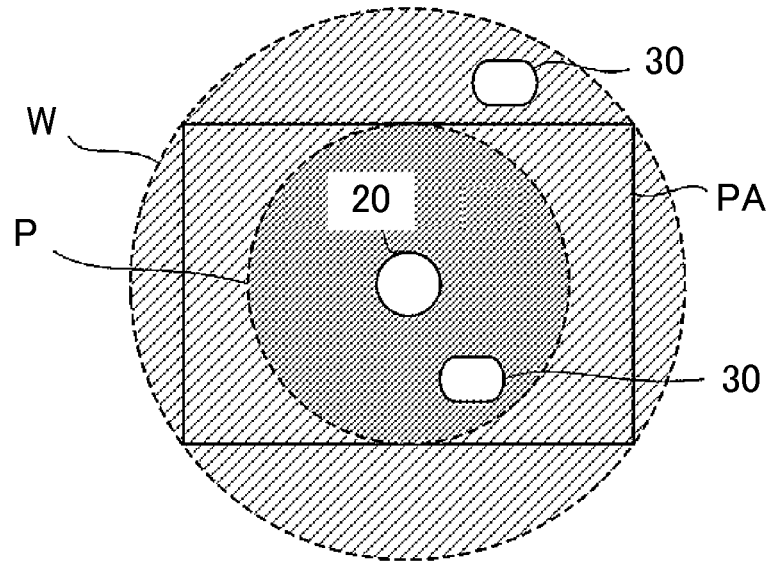
FIG. 1 is an explanatory diagram showing a concept of a radio wave coverage range and a reference strength according to the present invention.
Figure 2:
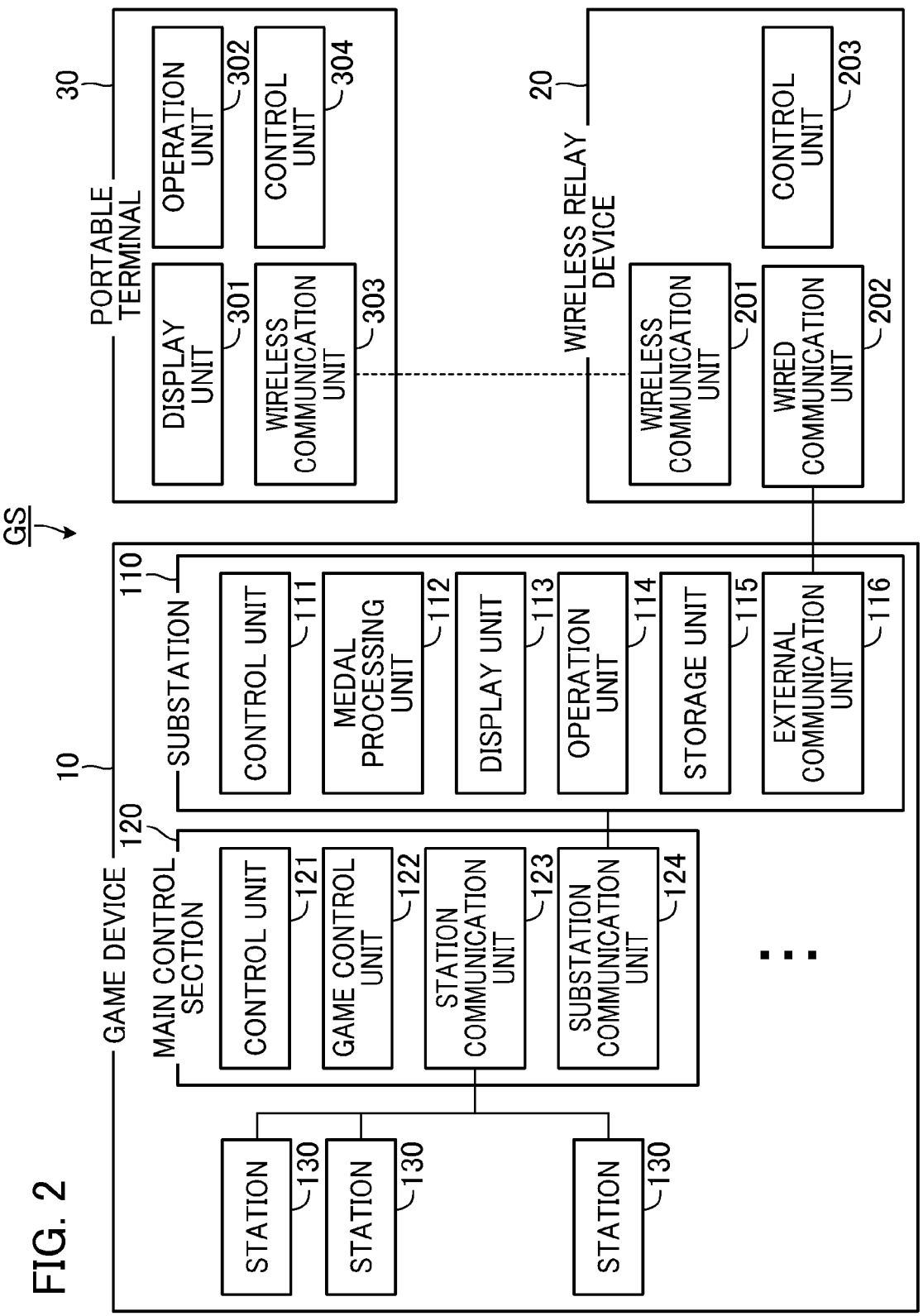
FIG. 2 is a block diagram showing a game system according to an embodiment of the present invention.

FIG. 2 is a block diagram of a game system GS according to an embodiment of the present invention. The game system GS is formed by including a game device 10 and a wireless relay device 20 provided in a game arcade and the like and a portable terminal 30. The portable terminal 30 is a portable terminal owned by a player or rented at the game arcade. Wirelessly connecting the game device 10 and the portable terminal 30 via the wireless relay device 20 enables a remote play of a game from the portable terminal 30 at places away from the game device 10.

A-1. Structure of Respective Devices

A-1-1. Structure of Game Device 10

The game device 10 of the present embodiment is a device that performs a medal game that is played by using medals or token coins, and is formed by including a main control section 120, a substation 110 and a plurality of stations 130. Each of the stations 130 is a device for providing a game play to a player, and includes a medal processing unit (not shown) that performs a reception processing to receive the medals inserted by the player and a dispensing processing to dispense medals obtained as a result of the game, an operation unit (not shown) that receives an operation from the player, a display unit (not shown) that displays a progress status of the game, and a control unit (not shown) that controls operation of the respective units of the station 130 in an integrated manner.

The substation 110 is a device that registers the portable terminal 30 that performs the remote play of the game performed at the game device 10, and also has a management function for a store manager to perform operational management. The substation 110 includes a medal processing unit 112 that performs a reception processing to receive the medals inserted by the player for performing the remote play and a dispensing processing to make a settlement and dispense the medals of the player at the end of the remote play, a display unit 113 that displays various types of information, an operation unit 114 that receives an operation from the player, a storage unit 115 that stores various types of information, an external communication unit 116 that is connected via a wire to the wireless relay device 20 to realize communication with the wireless relay device 20, and a control unit 111 that controls operation of the respective units of the substation 110 in an integrated manner. It is to be noted that, when the store manager uses the management function, the operation unit 114 may also be used as an operation unit to be operated by the store manager.

The main control section 120 is a device that controls the progress of the game performed in the game device 10, that receives operation information from the respective stations 130, and that informs the respective stations 130 of the result of the game. The main control section 120 has a game control unit 122 that controls the progress of the game, a station communication unit 123 that communicates with the respective stations 130, a substation communication unit 124 that communicates with the substation 110, and a control unit 121 that controls operation of the respective units of the main control section 120 in an integrated manner A-1-2. Structure of Portable Terminal 30

The portable terminal 30 includes a display unit 301 that displays the progress status of the game, an operation unit 302 that receives operation from the player, a wireless communication unit 303 that communicates wirelessly with the wireless relay device 20, and a control unit 304 that controls operation of the respective units of the portable terminal 30 in an integrated manner.

A-1-3. Structure of Wireless Relay Device 20

The wireless relay device 20 of the present embodiment is a wireless transmitter-receiver (wireless LAN access point) that acts as a bridge between a wired LAN and a wireless LAN, and enables the communication between the game device 10 and the portable terminal 30. The wireless relay device 20 has a wireless communication unit 201 that wirelessly communicates with the wireless communication unit 303 of the portable terminal 30, a wired communication unit 202 that connects to the external communication unit 116 via wire to enable communication with the external communication unit 116 of the game device 10, and a control unit 203 that controls operation of the respective units of the wireless relay device 20 in an integrated manner.

A-1-4. Summary of Structure of Respective Devices

As described thus far, according to the game system GS of the present embodiment, connecting the game device 10 and the portable terminal 30 in a way that is communicable via the wireless relay device 20 makes it possible to realize the remote play of playing, remotely from the portable terminal 30, a game executed in the game device 10.

It is to be noted that the communication between the game device 10 and the portable terminal 30 is performed via the wireless relay device 20, as described above. However, in order to simplify the description in the following explanation, the existence of the wireless relay device 20 is sometimes omitted and expressed merely by the relationship between the game device 10 and the portable terminal 30.

The communication between the game device 10 as a server and the portable terminal 30 as a client employs an HTTP protocol, and is pull-type communication in which data is pulled up by the client from the server. Therefore, the data is not transmitted from the server to the client at any given timing.

Specifically, the communication regarding the progress of the game in the remote play includes communication for reflecting the player's operation information in the portable terminal 30 on the game, and communication for updating the progress status of the game to be displayed on the portable terminal 30, both of which are realized by HTTP requests from the portable terminal 30 to the game device 10. In the former communication, when the player inputs the operation to the game in the operation unit 302 of the portable terminal 30, the portable terminal 30 transmits the HTTP request including the operation information to the game device 10. The game device 10, having received the HTTP request, reflects the operation information on the game in progress. In the latter communication, the portable terminal 30 periodically transmits to the game device 10 the HTTP request requesting a web page indicating the progress status of the game. The game device 10, having received the HTTP request, transmits the web page indicating the progress status of the game to the portable terminal 30. The portable terminal 30 displays the web page received from the game device 10 on the display unit 301, thereby updating the progress status of the game.

A-2. Flow Up to Start of Remote Play

Figure 3:
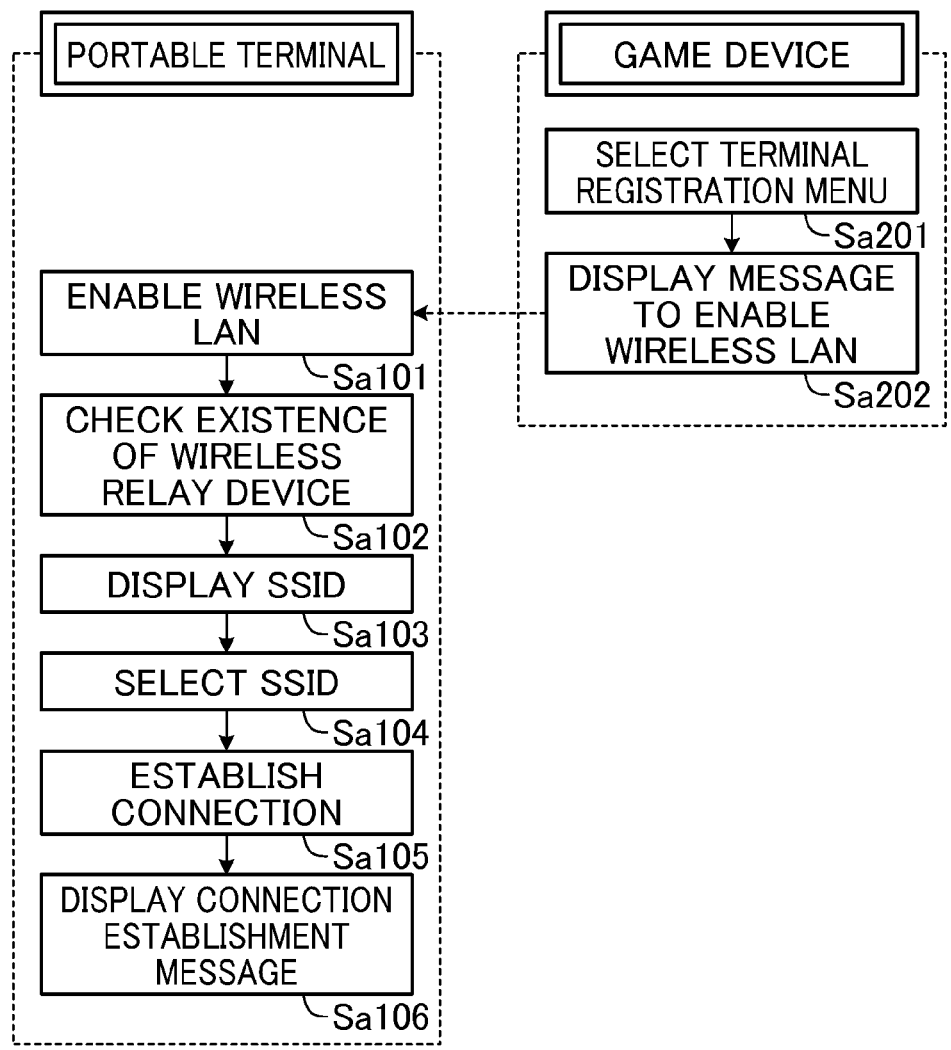
FIG. 3 is a sequence chart showing registration procedures up to a first connection state according to the embodiment.

Before performing the remote play of playing the game executed in the game device 10 from the portable terminal 30 remotely, the player needs to register the portable terminal 30 with the game device 10 at the substation 110. The processing to register the portable terminal 30 with the game device 10 is explained using a sequence chart shown in FIG. 3.

A-2-1. Connection Process of Connecting of Portable Terminal 30 and Wireless Relay Device 20

First, the player operates the operation unit 114 and selects an item of "registration of the remote play terminal" from an operation menu displayed on the display unit 113 of the substation 110 (Sa201). When this item is selected, the substation 110 causes the display unit 113 to display a message prompting the player to enable a wireless LAN mode of the portable terminal 30 owned by the player, and to select the wireless relay device 20 having a game name that can be played in the game device 10 (Sa202).

Figure 4:
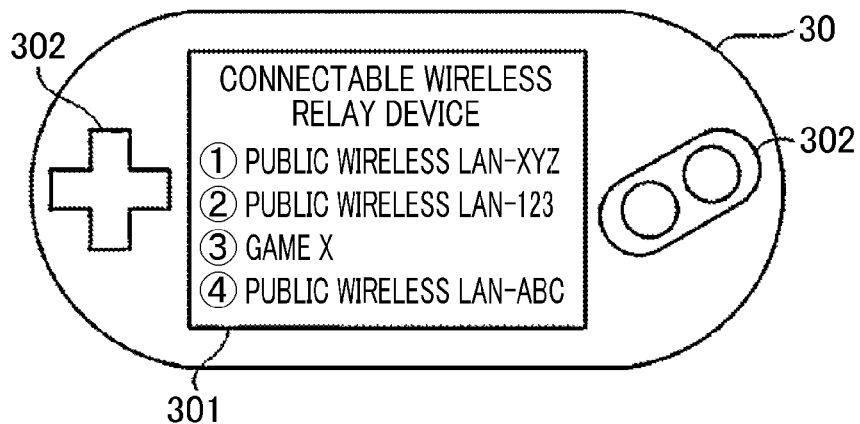
FIG. 4 is an explanatory diagram showing a selection screen of a wireless relay device according to the embodiment.

When the wireless LAN mode of the portable terminal 30 is enabled (Sa101), the control unit 304 determines whether or not there is a connectable wireless relay device 20 (Sa102). In a case in which it is determined that the connectable wireless relay device 20 exists, the control unit 304 causes the display unit 301 to display an SSID (Service Set Identifier) as an identifier of the wireless relay device 20 (Sa103). In the wireless relay device 20, a game name playable on the game device 10 that is connected to the wireless relay device 20 is set in advance as the SSID. Therefore, the game name (game X) is displayed as the SSID on the display unit 301, as shown in FIG. 4. In a case in which it is determined that there is no connectable wireless relay device 20 in the step Sa102, the portable terminal 30 disables the wireless LAN mode, although this is not illustrated.

Next, when a plurality of SSIDs are displayed on the display unit 301, the player selects, out of these, the SSID that displays the game name playable in the game device 10 (Sa104). A wireless control unit 303 of the portable terminal 30 performs a control process of establishing a wireless communication connection between the wireless relay device 20 having the selected SSID as the identifier and the portable terminal 30 (Sa105). As a result of this, a message indicating that the connection is established is displayed on the display unit 301 (Sa106). In the following explanation, such a state in which the SSID corresponding to the wireless relay device 20 connected to the game device 10 via wire is selected and in which the communication connection between the portable terminal 30 and the game device 10 is now established, as described above, will be referred to as a "first connection state".

A-2-2. Registration Processing of Registering Portable Terminal 30

Figure 5:
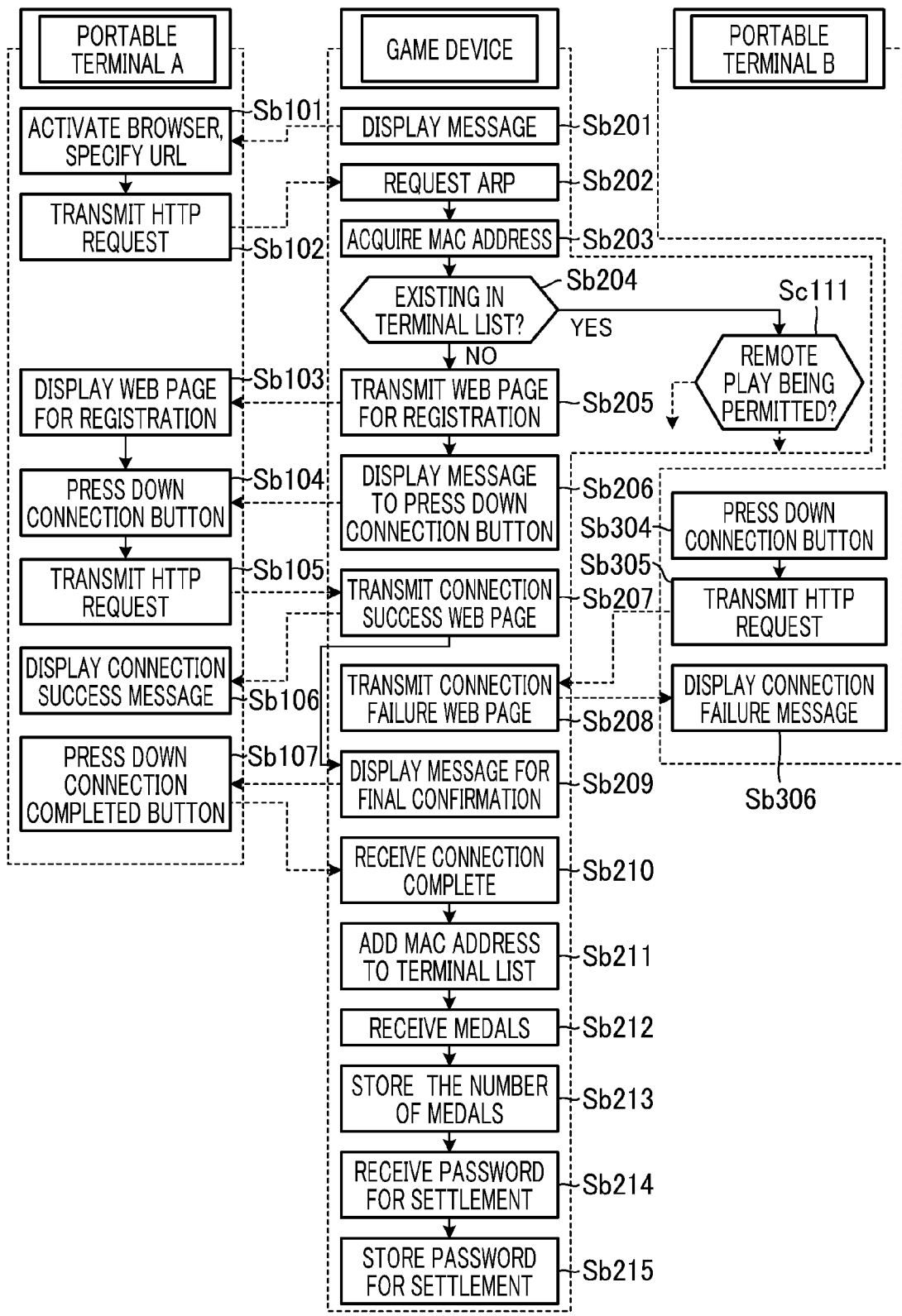
FIG. 5 is a sequence chart showing registration procedures up to a second connection state according to the embodiment.

Next, a registration processing to register the portable terminal 30 with the game device 10 is explained by using a sequence chart shown in FIG. 5. This registration processing is a processing to register the portable terminal 30 with the game device 10 at the discretion of the player. It is to be noted that, in FIG. 5, the portable terminal 30 of the player operating the substation is referred to as a "portable terminal A", and the portable terminal 30 of another player is referred to as a "portable terminal B" to distinguish them.

The substation 110 causes the display unit 113 of the substation 110 to display a message prompting the player to activate a web browser BA of the portable terminal A and to specify a given URL (Uniform Resource Locator) (Sb201). When, by the player, the web browser BA of the portable terminal A is activated and the displayed URL is specified in accordance with the message displayed on the display unit 113 (Sb101), the portable terminal A transmits an HTTP request requesting a web page corresponding to the specified URL to the game device 10 (Sb102). It is to be noted that the URL is specified only for the purpose of triggering the transmission of the HTTP request, and therefore, the URL is not limited to a specific form.

Upon receipt of the HTTP request, the game device 10 uses an address resolution protocol (ARP) to transmit an ARP request to the transmitter of the HTTP request (Sb202), and acquires a MAC address (Media Access Control address) as identification information of the portable terminal A (Sb203). Specifically, when the game device 10 transmits a broadcast message by specifying an IP address of the portable terminal A that is the transmitter of the HTTP request, the portable terminal A having the specified IP address sends the MAC address of the portable terminal A as a reply, and the game device 10 acquires this MAC address.

Figure 6:
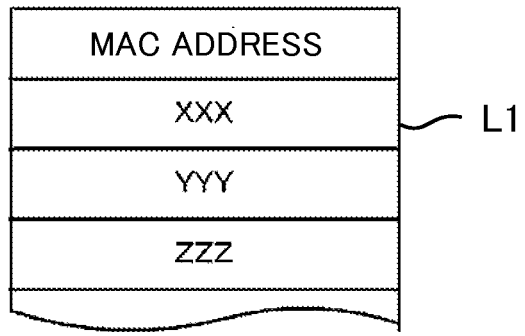
FIG. 6 is an explanatory diagram showing contents stored in a remote play terminal list according to the present embodiment.

FIG. 6 is a diagram showing a part of the contents stored in a remote play terminal list (registration list) L1. The remote play terminal list L1 is stored in the storage unit 115 and indicates a list of the MAC addresses corresponding to all the portable terminals 30 that have established the connection with the game device 10.

In acquiring the MAC address of the portable terminal A as the transmitter of the HTTP request, the game device 10 determines whether or not the MAC address exists in the remote play terminal list L1 (Sb204). In a case in which it is determined that the MAC address to be confirmed exists in the remote play terminal list L1 (Sb204: YES), it means that the portable terminal A is already in a later-described second connection state (registered in the game device 10). Therefore, the game device 10 proceeds to a later-described step Sc111 in FIG. 13 and determines whether or not the remote play is permitted. In a case in which it is determined that the remote play of the portable terminal A is permitted, the game device 10 transmits, to the portable terminal A, a web page showing the progress status of the game performed in the game device 10, as a reply to the HTTP request (Sc113).

Meanwhile, in the determination of the step Sb204, it is determined that the MAC address to be confirmed does not exist in the remote play terminal list L1 (Sb204: NO) if the portable terminal A has not yet been registered with the game device 10. Therefore, the game device 10 transmits a web page for remote play terminal registration (Sb205) to the portable terminal A having the MAC address, as a reply to the HTTP request.

Figure 7:
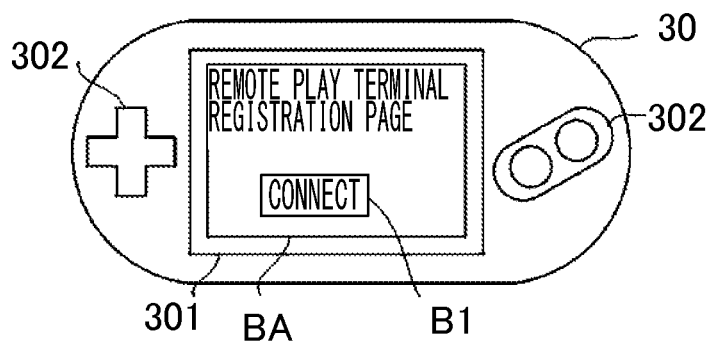
FIG. 7 is an explanatory diagram showing a remote play terminal registration page according to the present embodiment.

After the web page for remote play terminal registration is transmitted from the game device 10 to the portable terminal A, the substation 110 causes the display unit 113 of the substation 110 to display a message prompting the player to press a "CONNECT" link button B1 displayed in the web page of the portable terminal A (Sb206). Meanwhile, when the portable terminal A receives the web page for remote play terminal registration, it causes the web browser BA to display the web page for remote play terminal registration including the "CONNECT" link button B1, as shown in FIG. 7 (Sb103). Next, according to the message displayed on the display unit 113 of the substation 110, the player operates the portable terminal A to press the "CONNECT" link button B1 on the web browser BA (Sb104).

Figure 8:
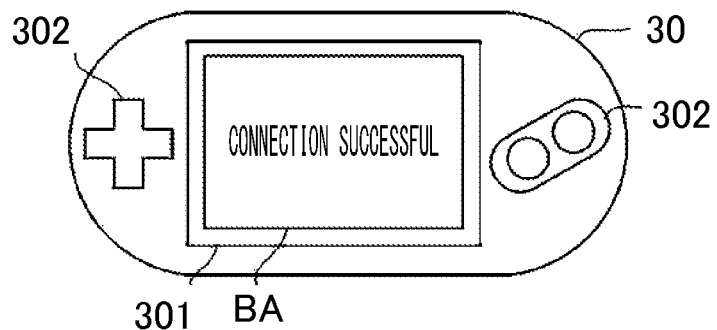
FIG. 8 is an explanatory diagram showing a screen displaying a connection success message according to the present embodiment.
Figure 9:
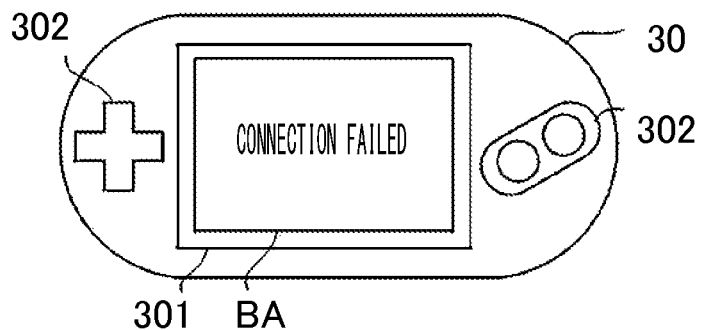
FIG. 9 is an explanatory diagram showing a screen displaying a connection failure message according to the present embodiment.

When the "CONNECT" link button B1 on the web browser BA is pressed, the portable terminal A transmits to the game device 10 an HTTP request requesting a web page corresponding to an URL indicating the connection request (Sb105). When receiving the HTTP request (the URL indicating the connection request), the game device 10 transmits to the source portable terminal A (connection requesting portable terminal) a web page including a "CONNECTION SUCCESSFUL" message (Sb207). It should be noted that, in a case in which the "CONNECT" link button B1 is pressed at a plurality of portable terminals 30 (the portable terminal A and the portable terminal B) (Sb104 and Sb304) and in which a plurality of connection requests are generated (Sb105, Sb305), the game device 10 transmits the web page including the "CONNECTION SUCCESSFUL" message to the portable terminal 30 (portable terminal A) from which the connection request is received first (Sb207), and transmits a web page including a "CONNECTION FAILED" message to the portable terminal 30 (portable terminal B) from which the connection request is received second and thereafter (Sb208). Specifically, "CONNECTION SUCCESSFUL" is displayed on the web browser BA of the portable terminal A that has received the web page including the "CONNECTION FAILED" message as shown in FIG. 8 (Sb106), and "CONNECTION FAILED" is displayed on the web browser BA of the portable terminal B that has received the "CONNECTION FAILED" message as shown in FIG. 9 (Sb306).

After the game device 10 transmits to the portable terminal A the web page including the "CONNECTION SUCCESSFUL" message in the step Sb207, the substation 110 causes the display unit 113 of the substation 110 to display a message for final confirmation (Sb209). Specifically, a "CONNECTION COMPLETED" button and a "RETRY" button are displayed on the display unit 113 together with a message of "please press the "CONNECTION COMPLETED " button when the "CONNECTION SUCCESSFUL" is displayed on your portable terminal, and the " RETRY " button when the "CONNECTION FAILED" is displayed".

The player confirms that the "CONNECTION SUCCESSFUL" is displayed on the web browser BA of the portable terminal A owned by the player, and presses the "CONNECTION COMPLETED" button displayed on the display unit 113 of the substation 110 (Sb107). That is, the player performs a connection confirmation operation. When the "CONNECTION COMPLETED" button is pressed (Sb210), the substation 110 causes the display unit 113 to display a message, "a connection is completed", and adds the MAC address "ABC" of the portable terminal A, to which the game device 10 transmits the "CONNECTION SUCCESSFUL" message, to the remote play terminal list L1 stored in the storage unit 115 (Sb211), as shown in FIG. 10. In other words, the MAC address of the portable terminal A that receives the connection confirmation operation by the player is added to the remote play terminal list L1. That is, the MAC address of the portable terminal A is registered with the remote play terminal list L1 at the discretion of the player.

Next, the substation 110 causes the display unit 113 to display a message prompting the player to insert medals. When receiving the medals inserted by the player into the medal processing unit 112 (Sb212), the substation 110 associates the number of the medals "150" that are inserted and counted in the medal processing unit 112, with the above-described MAC address "ABC" registered in the remote play terminal list L1, as shown in FIG. 11, and stores it in the storage unit 115 (Sb213). Next, the substation 110 causes the display unit 113 to display a message prompting the player to input a password for settlement. Upon receipt of the password for settlement that is inputted by the player by operating the operation unit 114 (Sb214), as shown in FIG. 12, the inputted password ("P0123") is associated with the above-described MAC address "ABC" registered in the remote play terminal list L1 and stored in the storage unit 115 (Sb215, FIG. 12), similarly to the number of medals. The password is used as means for verifying the identity when the player finishes the remote play using the portable terminal 30 and dispenses the remaining medals from the substation 110.

In the following explanation, such a state in which the registration is completed of the MAC address of the portable terminal 30 with the remote play terminal list L1 as described above is referred to as the "second connection state". In other words, the "second connection state" means the state that the association between the portable terminal 30 owned by the player and the number of medals inserted by the player is completed. A series of procedures for shifting the first connection state to the second connection state is necessary in order to associate the portable terminal 30 owned by the player with the number of the medals inserted by the player. In other words, the series of procedures is the processing to confirm whether the player owning the portable terminal 30 is the same as the player who has inserted the medals. Because multiple portable terminals 30 can be in the first connection state with the game device 10 at the same time, a player allowed to operate a single substation 110 (including insertion of the medals) is limited to only one. A player oneself who operates the substation 110 is made to specify the portable terminal 30 that is owned by the player and is to be registered with the game device 10. As a result of this, the player owning the portable terminal 30 becomes the same as the player having inserted the medals.

A-3. Remote Play Prohibition Control Processing

Next, an explanation is given to a remote play prohibition control processing of the portable terminal 30 that is performed at the game device 10. When the portable terminal 30 enters the second connection state, the game device 10 controls to permit the remote play, out of a range where the radio waves from the wireless relay device 20 can reach, for only the portable terminal 30 for which a signal strength of a radio signal (received signal strength) of radio waves sent out from the portable terminal 30 and received at the wireless relay device 20 have reached a predetermined reference strength P. In other words, the remote play prohibition control processing is also a game permission control processing. By setting the reference strength P appropriately, it is possible to respond to a request from the store manager wishing to permit the remote play only within a store area PA (within a game arcade site).

Specifically, the game device 10 controls to switch permission and prohibition of the remote play by the portable terminal 30 depending on the signal strength of the radio signal transmitted from the portable terminal 30 and received at the wireless relay device 20 in the range where the radio wave from the wireless relay device 20 is reachable. In determining whether or not the received signal strength corresponding to each portable terminal 30 has reached the predetermined reference strength P, an RSSI (Received Signal Strength Indication) value indicating the signal strength of the radio signal transmitted from the portable terminal 30 and received at the wireless relay device 20 is used (hereinafter referred to as the RSSI value of the portable terminal 30).

As the portable terminal 30 moves closer to the wireless relay device 20, the signal strength of the radio signal that is transmitted from the portable terminal 30 and is received in the wireless relay device 20 increases, and hence the RSSI value of the portable terminal 30 indicates a higher value. In contrast, as the portable terminal moves away from the wireless relay device 20, the signal strength of the radio signal that is transmitted from the portable terminal 30 and received in the wireless relay device 20 decreases, and hence the RSSI value of the portable terminal 30 indicates a lower value. The present embodiment uses this characteristic and determines whether the RSSI value of the portable terminal 30 has reached the reference strength P that is set in advance in the game device 10 or not, in the range where the radio waves can reach from the wireless relay device 20, thereby controlling the switching between permission and prohibition of the remote play of the portable terminal 30. Specifically, with regard to the portable terminal 30 that is located in the range where the radio waves can reach from the wireless relay device 20 and that is in the second connection state (registered portable terminal), the remote play by this portable terminal 30 is permitted in a case in which the RSSI value of the portable terminal 30 is higher than the reference strength P, and the remote play by this portable terminal 30 is prohibited in a case in which the RSSI value of the portable terminal 30 is lower than the reference strength P.

The wireless relay device 20 measures the RSSI value (i.e., the signal strength of the radio signal transmitted from each portable terminal 30 and received at the wireless relay device 20) of every portable terminal 30 that is in the first connection state and in the second connection state. Using pieces of information on the RSSI values of the respective portable terminals 30 acquired from the wireless relay device 20, the game device 10 controls for every portable terminals 30 that is in the second connection state, to permit the remote play by the portable terminal 30 if it is determined that the RSSI value has reached the reference strength P or to prohibit the remote play by the portable terminal 30 if it is determined that the RSSI value has not reached the reference strength P. In other words, the game device 10 controls to permit the remote play by the portable terminal 30 when its RSSI value is equal to or higher than the reference strength P, and to prohibit the remote play by the portable terminal 30 when its RSSI value is lower than the reference strength P. It is to be noted that the wireless relay device 20 measures the RSSI values every 10 seconds, for example, but its interval may be freely selected.

A-3-1. Setting Processing of Setting Permission or Prohibition of Remote Play

Hereinafter, a flow of the control will be specifically explained using a sequence chart shown in FIG. 13.

The portable terminal 30 transmits the radio signal constantly while it is in the wireless LAN mode (Sc301). On the other hand, the wireless relay device 20 receives the radio signal transmitted from the portable terminal 30 (Sc201). While receiving the radio signal transmitted from the portable terminal 30, the wireless relay device 20 measures the signal strength of the received radio signal (Sc202). The game device 10 and the wireless relay device 20 are connected as a client (game device 10) to web server (wireless relay device 20) relationship, and between the devices is controlled by the HTTP protocol.

Next, the game device 10 requests wireless LAN environment information from the wireless relay device 20 (Sc101). Specifically, the game device 10 transmits, to the wireless relay device 20, an HTTP request requesting a web page indicating the wireless LAN environment information. The wireless LAN environment information is information including the contents of association between the MAC address corresponding to each portable terminal 30 in the first connection state or in the second connection state and the RSSI value. Upon receiving the request of the wireless LAN environment information, the wireless relay device 20 transmits the wireless LAN environment information to the game device 10 as a response (Sc203). Specifically, it transmits the web page indicating the wireless LAN environment information to the game device 10. The game device 10 acquires the wireless LAN environment information as the response from the wireless relay device 20 (Sc102). Specifically, it acquires an HTML file constituting the web page indicating the wireless LAN environment information. The game device 10 repeatedly performs the request for the wireless LAN environment information to the wireless relay device 20 every 10 seconds.

Next, the game device 10 performs a setting processing to set permission or prohibition of the remote play by each of the portable terminals 30 that is in the second connection state with respect to the game device 10, by using the wireless LAN environment information acquired from the wireless relay device 20. Specifically, because every portable terminal 30 that is registered in the remote play terminal list L1 is in the second connection state, the game device 10 selects, as an object to be confirmed, the MAC address corresponding to the portable terminal 30 registered in the remote play terminal list L1 stored in the storage unit 115 (Sc103).

Next, the game device 10 analyzes the HTML file to search, from text information of the HTML file, for the RSSI value corresponding to the MAC address to be confirmed, in order to acquire the RSSI value corresponding to the MAC address selected as the object to be confirmed (Sc104). Thus, the game device 10 acquires the RSSI value corresponding to the MAC address to be confirmed, from the wireless LAN environment information acquired from the wireless relay device 20 (Sc105).

Next, the game device 10 compares the acquired RSSI value with the reference strength P (Sc106). In a case in which the RSSI value is lower than the reference strength P (Sc106: YES), the game device 10 sets to prohibit the remote play by the portable terminal 30 having the MAC address to be confirmed (the MAC address corresponding to the RSSI value).

Specifically, as shown in FIG. 14, a remote play prohibition flag (disabling information) is stored in association with the MAC address "ABC" to be confirmed in the remote play terminal list L1 stored in the storage unit 115. The remote play prohibition flag is set to have an initial value when the first connection state transits to the second connection state.

The initial value is set as "0" indicating the permission.

In setting the remote play prohibition, the game device 10 updates the remote play prohibition flag to be "1" indicating the prohibition (Sc107). Specifically, in a case in which the remote play prohibition flag stored in association with the MAC address "ABC" is "0" indicating the permission, the flag is changed to "1" indicating the prohibition, and in a case in which it is "1" indicating the prohibition, the flag is not changed.

Meanwhile, when the RSSI value is equal to or greater than the reference strength P (Sc106: NO), the game device 10 is set to permit the remote play by the portable terminal 30 having the MAC address to be confirmed. Specifically, the remote play prohibition flag is updated to be "0" indicating the permission (Sc108). More specifically, in a case in which the remote play prohibition flag stored in association with the MAC address "ABC" to be confirmed is "0" indicating the permission, the flag is not changed, and in a case in which it is "1" indicating the prohibition, the flag is changed to "0" indicating the permission. It is to be noted that the initial value may be "1" indicating the prohibition instead of "0" indicating the permission.

As described thus far, the game device 10 repeatedly performs a series of procedures from the selection of the MAC address to be confirmed (Sc103) to the setting of the remote play prohibition (Sc107) or the setting of the remote play permission (Sc108) for every MAC address in the remote play terminal list L1 stored in the storage unit 115 (Sc109: NO). When the series of procedures is completed for all the MAC addresses in the remote play terminal list L1 (Sc109: YES), the game device 10 returns its routine back to the step Sc101 and requests the wireless LAN environment information from the wireless relay device 20. It is to be noted that, because the game device 10 requests the wireless LAN environment information from the wireless relay device 20 every 10 seconds, the states of the respective portable terminals 30 registered in the game device 10, i.e., the states of the MAC addresses in the remote play terminal list L1 stored in the storage unit 115 are updated every 10 seconds.

According to the above-described setting processing, necessary information for the remote play prohibition processing (game permission control processing) is registered in the contents stored in the remote play terminal list L1 (FIG. 14), with regard to the respective portable terminals 30 (respective MAC addresses).

A-3-2. Remote Play Prohibition Processing

Next, an explanation is given to the control with regard to the portable terminal 30 by the game device 10 based on the permission or prohibition setting of the remote play. Upon receiving an operation relating to the game from the player in the operation unit 302 (Sc302), the portable terminal 30 transmits an HTTP request including the operation information to the game device 10 (Sc303). Upon receiving the HTTP request from the portable terminal 30 (Sc110), the game device 10 confirms whether the remote play of the portable terminal 30 from which the HTTP request including the operation information is transmitted is permitted or not (Sc111), and performs the processing according to the result of the confirmation. Specifically, upon receiving the HTTP request from the portable terminal 30 (Sc110), the game device 10 determines whether the received HTTP request includes the operation information or not, and also determines whether the remote play prohibition flag stored in association with the MAC address to be confirmed in the remote play terminal list L1 stored in the storage unit 115 is "0", indicating the permission or not. In a case in which the received HTTP request includes the operation information and in which the remote play prohibition flag is "0", the game device 10 causes the operation information to be reflected in the game in progress (Sc111: YES→Sc112). Moreover, in a case in which the remote play prohibition flag is "1" and in which the result of determination in the step Sc111 is NO, no processing is performed with regard to the received HTTP request whether or not the received HTTP request includes the operation information.

Figure 13:
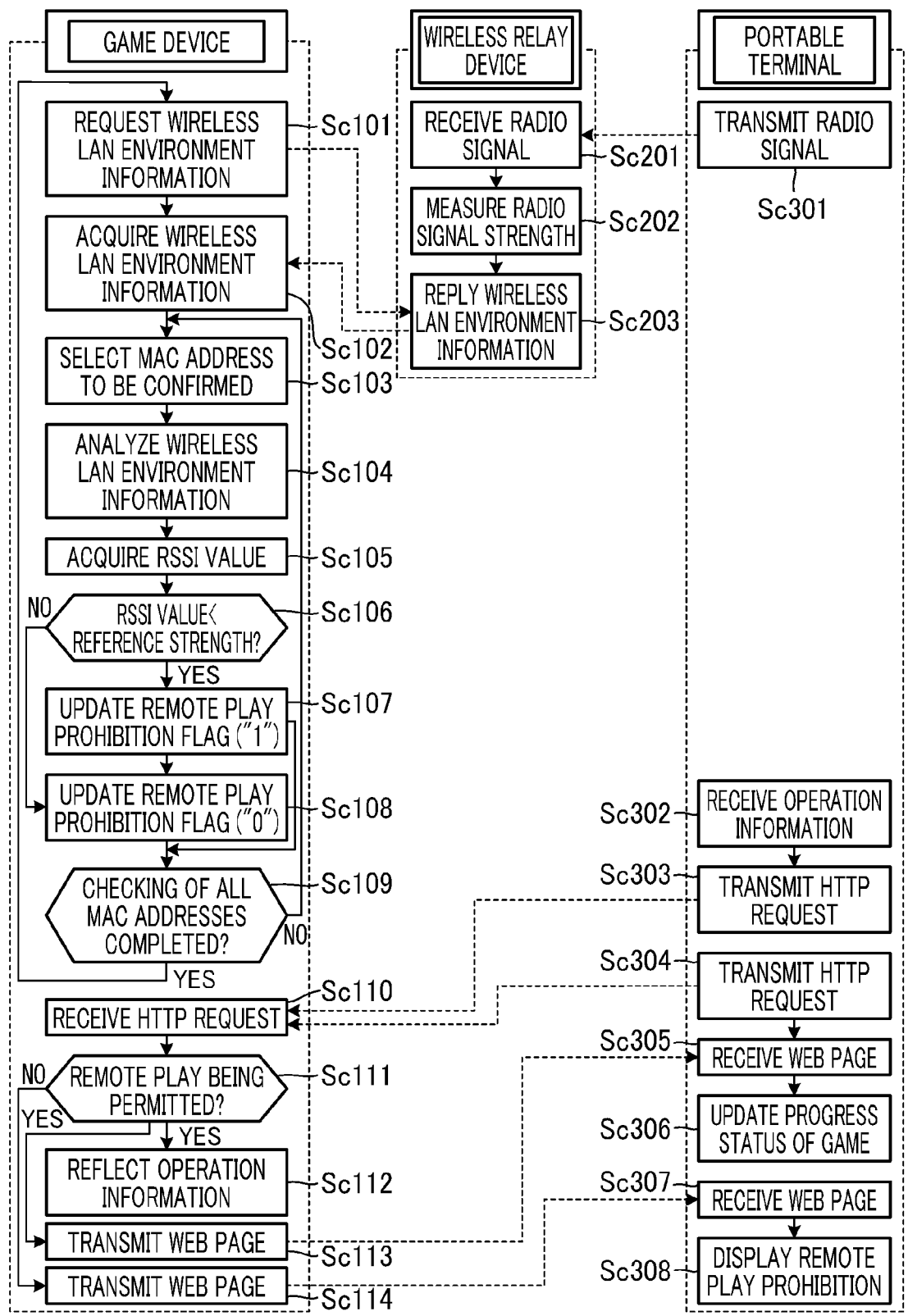
FIG. 13 is a sequence chart showing a flow of control for a remote play permission according to the present embodiment.

It is to be noted that, among the steps in FIG. 13, steps taken in a case in which the determination result in the step Sc111 is negative (Sc111: NO) (specifically, steps Sc114, Sc307 and Sc308) are steps according to a modification example of this embodiment, the details of which will be explained later.

Besides the above-described timings of operations made to the portable terminal 30 by the player, the portable terminal 30 periodically transmits to the game device 10 an HTTP request (HTTP request not including the operation information) in order to update the progress status of the game displayed on the portable terminal 30 (Sc304). Upon receiving the HTTP request from the portable terminal 30 (Sc110), the game device 10 determines whether the received HTTP request includes the operation information or not, checks whether the remote play of the portable terminal 30 that has transmitted the HTTP request is permitted or not (Sc111), and performs the processing according to the result of the checking. Specifically, upon receiving from the portable terminal 30 the HTTP request requesting a web page showing the progress status of the game (Sc110), the game device 10 determines whether or not the remote play prohibition flag stored in association with the MAC address to be confirmed in the remote play terminal list L1 stored in the storage unit 115 is "0", indicating the permission (Sc111). In a case in which the received HTTP request does not include the operation information and in which the remote play prohibition flag is "0", the game device 10 transmits to the portable terminal 30 the web page indicating the progress status of the game (Sc111: YES→Sc113). Meanwhile, irrespective of whether or not the received HTTP request includes the operation information, the result of determination in the step Sc 111 is NO in a case in which the remote play prohibition flag is "1", and no processing is performed with regard to the received HTTP request. Upon receiving the web page from the game device 10 (Sc305), the portable terminal 30 causes the display unit 301 to display the received web page on the web browser BA, so as to update the progress status of the game displayed on the portable terminal 30 (Sc306). As described above, in a case in which the remote play is permitted, the game device 10 reflects the operation information of the player on the game, or transmits the web page showing the progress status of the game to the portable terminal 30, so that the portable terminal 30 can continue the remote play of the game. Meanwhile, in a case in which the remote play is prohibited, because the game device 10 performs no processing, the operation information of the player is not reflected in the game. Also, the progress status of the game displayed on the portable terminal 30 is not updated, and therefore, it is not possible for the player to recognize the change in the progress status of the game. In other words, it is not possible for the portable terminal 30 to continue the remote play of the game.

A-4. Setting of Reference Strength P

Next, an explanation is given to the structure permitting the store manager to set the reference strength P. Physical environments such as the size and shape of a store area, the operation system in the store, and the like vary from one store to another, and therefore, the reference strength P to distinguish between the permitted area and the prohibited area of the remote play can be set by the store manager.

Figure 15:
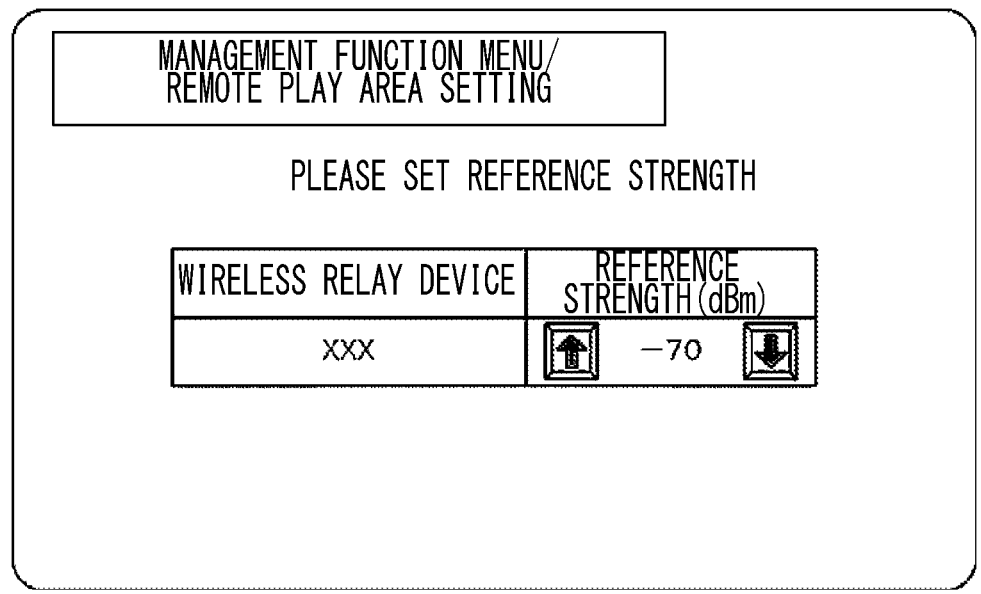
FIG. 15 is an explanatory diagram showing a setting screen of the reference strength according to the present embodiment.

In changing the reference strength P, the store manager inputs a manager key to the substation 110 and causes the substation 110 to shift to a test mode. Next, when an item "remote play area setting" is selected from a management function menu, a current setting status (−70 [dBm]) of the reference strength P corresponding to the wireless relay device 20 connected to the game device 10 is displayed on the display unit 113, as shown in FIG. 15. When the reference strength P is changed by operation to the operation unit 114, the changed new value is stored in the storage unit 115 and is used as the reference strength P in the subsequent remote play prohibition control.

As is understood from the above-described explanation, it is possible for the game device 10 to set the remote play permitted area and the remote play prohibited area at the discretion of the store manager, even when the portable terminal 30 is located in a range in which the radio waves from the wireless relay device 20 reach. Furthermore, by performing the remote play prohibition control with regard to the portable terminal 30 that is located in the remote play prohibited area, the remote play by the portable terminal 30 can be reliably prohibited. In other words, for the game device 10 at which the remote play using the portable terminal 30 is possible, effective management according to the store manager's wishes is possible.

B. Modifications

The present invention is not limited to the above-described embodiment and various modifications can be made, for example, as follows. One or more modes that are selected freely from the following exemplifications can be combined as necessary.

B-1. A Plurality of Wireless Relay Devices 20

According to the above-described embodiment, the explanation was given of the mode using one wireless relay device 20 for one game device 10. However, the present invention is not limited thereto and may use a plurality of wireless relay devices 20 for one game device 10. For example, in a case in which the shape of the store area is a rectangle (oblong), as shown in FIG. 16, two wireless relay devices, i.e., a wireless relay device 20A and a wireless relay device 20B are provided, and respective reference strengths Pa and Pb are set so that remote play permitted areas corresponding to the wireless relay devices 20A and 20B are maximized in the store.

Figure 18:
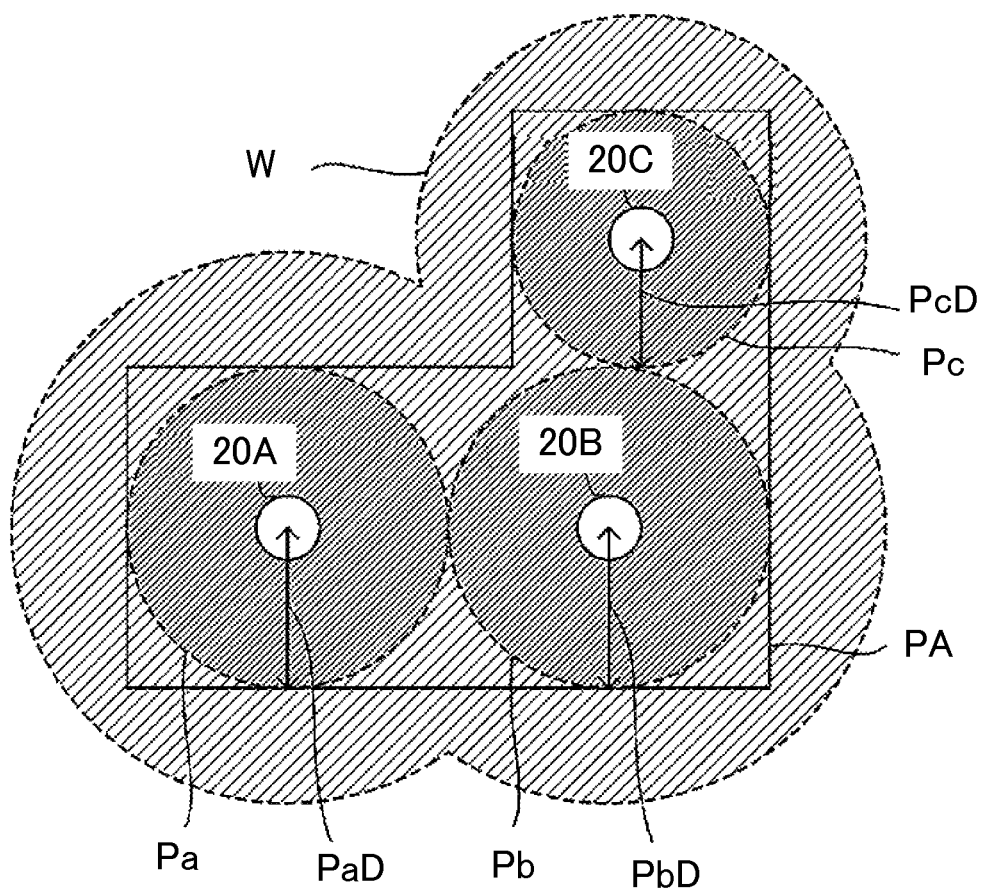
FIG. 18 is an explanatory diagram showing a mode of using three wireless relay devices according to the present embodiment.

In a case in which, for example, the shape of the store area is not a rectangle (in an L-shape), as shown in FIG. 18, three wireless relay devices, i.e., a wireless relay device 20A, a wireless relay device 20B, and a wireless relay device 20C are provided, and respective reference strengths Pa, Pb, and Pc are set so that remote play permitted areas corresponding to the wireless relay devices 20A, 20B, and 20C are maximized in the store.

Thus, even when the shape of the store area is complicated, the plurality of wireless relay devices 20 are used and located corresponding to the shape, whereby the effective operation of the game device 10 in which a game can be played remotely by using the portable terminal 30 is realized while satisfying the store manager's wishes.

Figure 16:
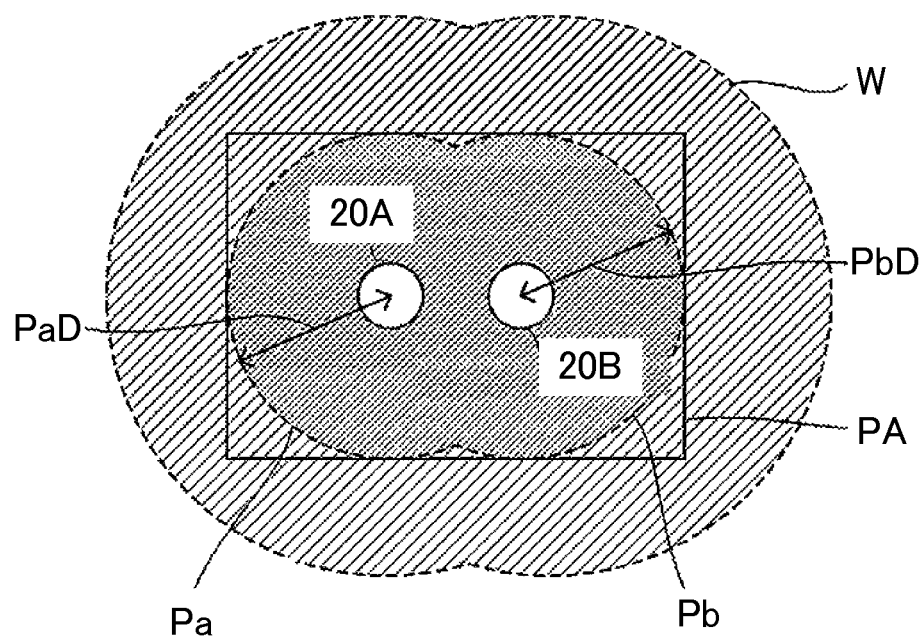
FIG. 16 is an explanatory diagram showing a mode of using two wireless relay devices according to the present embodiment.

In a case in which the two wireless relay devices 20A and 20B are used as shown in FIG. 16, the game system GS is formed by one wireless relay device 20A that is connected to the game device 10 via wire, and the other wireless relay device 20B that is connected wirelessly to the wireless relay device 20A. The portable terminal 30 for which a connection is established with the wireless relay device 20B communicates with the game device 10 via both of the wireless relay device 20B and the wireless relay device 20A. The reference strengths Pa and Pb that correspond to the plurality of wireless relay devices 20A and 20B, respectively, are stored in the storage unit 115 of the game device 10. By selecting the item "remote play area setting" from the management function menu at the game device 10, it is possible to independently set the reference strengths Pa and Pb corresponding to the wireless relay devices 20A and 20B.

Figure 17:
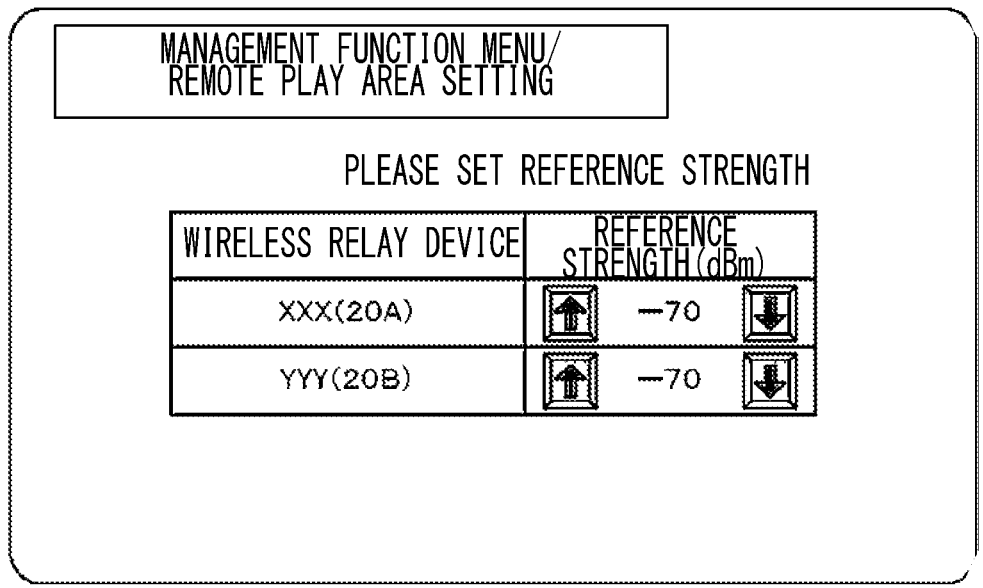
FIG. 17 is an explanatory diagram showing a setting screen of the reference strengths of the two wireless relay devices according to the present embodiment.

For example, in a case in which a distance PaD as a radius of a circle around the wireless relay device 20A having the maximum area in the store, and a distance PbD as a radius of a circle around the wireless relay device 20B having the maximum area in the store, are equal to each other, it is possible to set the reference strength Pa of the wireless relay device 20A and the reference strength Pb of the wireless relay device 20B to have the same value (−70 [dBm]), as shown in FIG. 17.

Furthermore, in a case in which the three wireless relay devices 20A, 20B and 20C are used, as shown in FIG. 18, the game system GS is formed by the wireless relay device 20A that is connected to the game device 10 via wire, and the wireless relay devices 20B and 20C that are connected wirelessly to the wireless relay device 20A, respectively. For example, the portable terminal 30, for which a connection with the wireless relay device 20B is established, communicates with the game device 10 via both of the wireless relay device 20B and the wireless relay device 20A.

Figure 19:
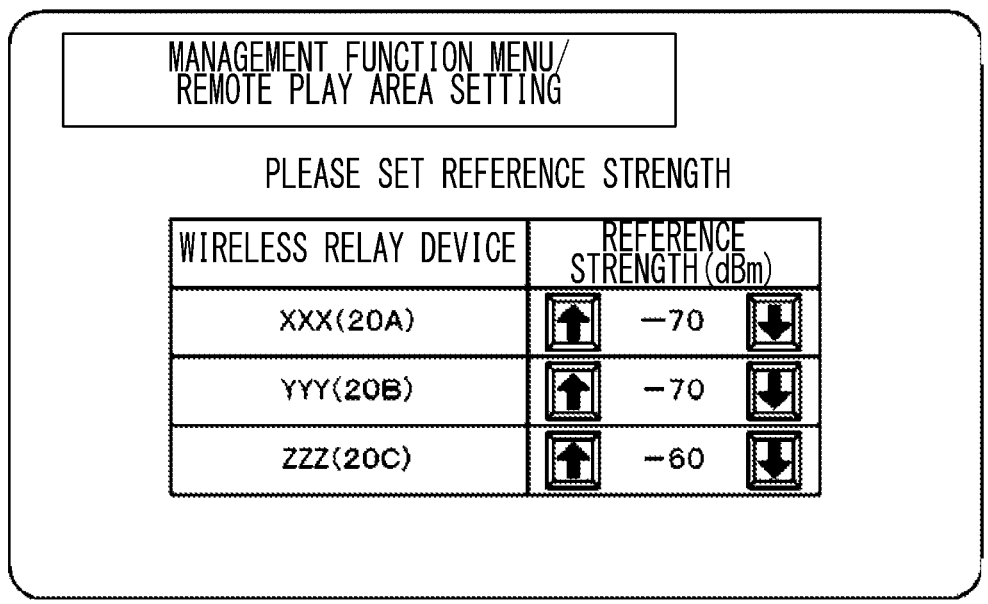
FIG. 19 is an explanatory diagram showing a setting screen of the reference strengths of the three wireless relay devices according to the present embodiment.

In this example, it is supposed that the distance PaD as the radius of the circle around the wireless relay device 20A having the maximum area in the store is equal to the distance PbD as the radius of the circle around the wireless relay device 20B having the maximum area in the store, and a distance PcD, as a radius of a circle around the wireless relay device 20C having the maximum area in the store, is shorter than PaD and PbD. In this case, as shown in FIG. 19, the reference strength Pa of the wireless relay device 20A and the reference strength Pb of the wireless relay device 20B are set to have the same value (−70 [dBm]), and the reference strength Pc of the wireless relay device 20C is set to be higher (−60 [dBm]) than Pa and Pb.

Thus, by the store manager setting the respective reference strengths P appropriately according to the shape of the store area, it is possible to set the remote play permitted area while prohibiting remote play outside the store area and minimizing the remote play prohibited area inside the store area.

B-2. Remote Play Prohibition Notice

According to the above-described embodiment, explanation was given for such a mode that, as the control to prohibit the remote play, the game device 10 does not perform any processing in response to the HTTP request received from the portable terminal 30. However, the present invention is not limited to the above. Instead, the game device 10 may inform the portable terminal 30 that the remote play is currently prohibited.

Among the steps shown in FIG. 13, the steps (specifically, the steps Sc114, Sc307 and Sc308) taken in a case in which the determination result in the step Sc111 is negative (Sc111: NO) are the steps according to the modification example of the embodiment.

Hereinafter, the flow of the control will be specifically explained using the sequence chart shown in FIG. 13.

Figure 20:
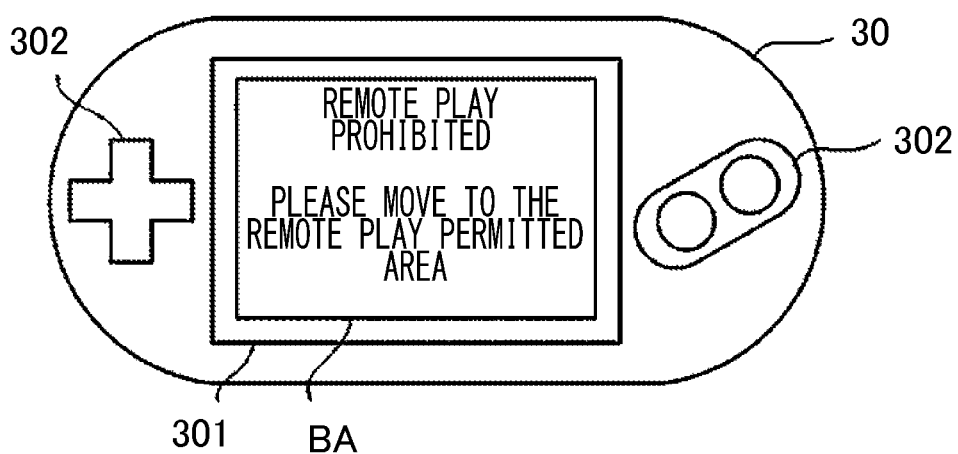
FIG. 20 is an explanatory diagram showing a screen displaying a remote play prohibition message according to the present embodiment.

The game device 10, when receiving the HTTP request requesting the web page showing the progress status of the game from the portable terminal 30 (Sc110), determines whether the remote play of the portable terminal 30 having transmitted the HTTP request is permitted or not (Sc111), and sends a notice to the portable terminal 30 according to the result of the determination. More specifically, in a case in which the remote play prohibition flag stored in association with the MAC address to be determined in the remote play terminal list L1 stored in the storage unit 115 is "1" (Sc111: NO), the game device 10 transmits a web page showing that the remote play is currently prohibited, instead of the web page showing the progress status of the game, in reply to the received HTTP request (Sc114). When receiving the web page from the game device 10 (Sc307), the portable terminal 30 causes the display unit 301 to display the received web page on the web browser BA (Sc308, FIG. 20). Specifically, "remote play is prohibited" and "please move to the remote play permitted area" are displayed on the display unit 301 of the portable terminal 30, as shown in FIG. 20.

As described above, the portable terminal 30 displays that the remote play is currently prohibited, and hence the player can recognize the reason why the remote play cannot be performed. After recognizing the displayed contents, it is possible for the player to determine the reason why the remote play cannot be performed; specifically, the reason is not communication connection failure between the portable terminal 30 and the game device 10 or the like but is that the radio signal transmitted from the portable terminal 30 not having reached the reference strength P, despite the communication connection being normal.

B-3. Lower Limit Reference Strength "Plow"

According to the above-described embodiment, the explanation is given to the mode of permitting the remote play at the portable terminal 30 for which the RSSI value reaches the reference strength P set correspondingly to the wireless relay device 20. However, the present invention is not limited to the above, and the remote play prohibition control may be performed based on a lower limit reference strength "Plow" for which the signal strength is set lower than that of the reference strength P.

Figure 21:
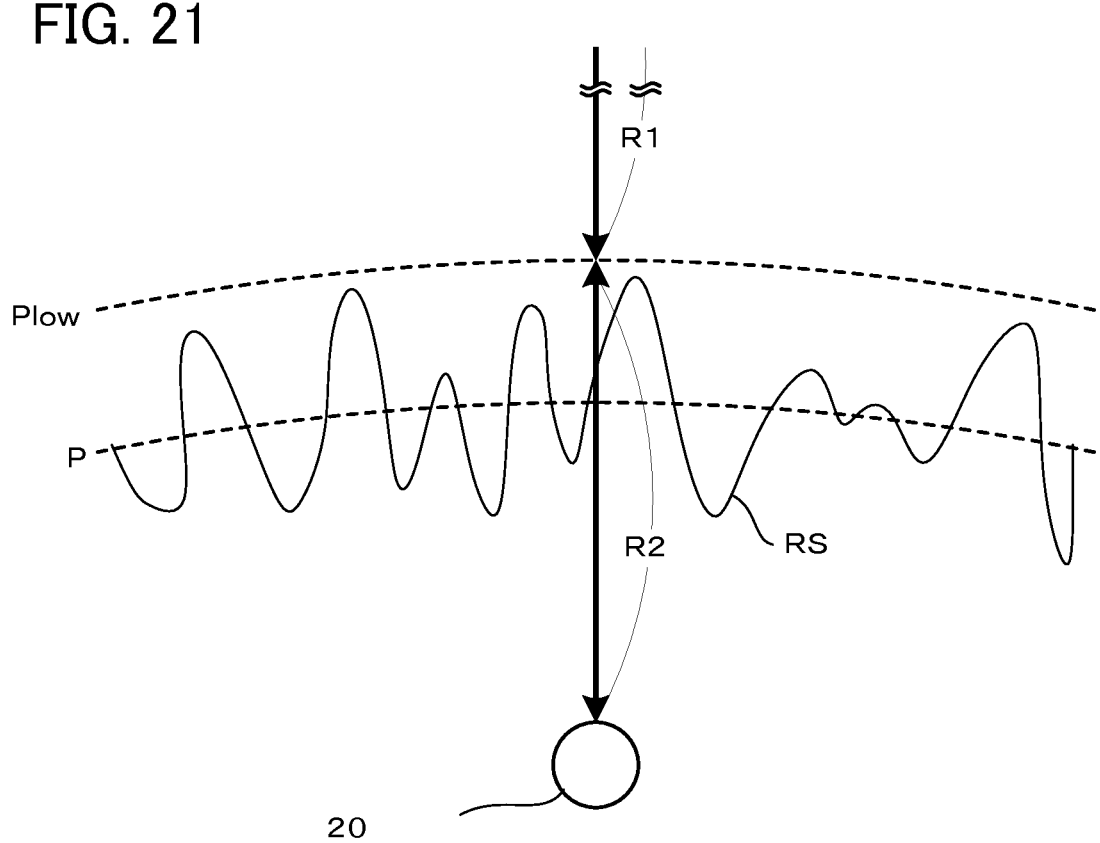
FIG. 21 is an explanatory diagram showing a concept of a lower limit reference strength according to the present embodiment.

Reasons the lower limit reference strength Plow is employed follow. The radio signal is susceptible to external influences. When equipment transmitting radio waves in the same frequency band is provided nearby, for example, the radio waves between the wireless relay device 20 and the portable terminal 30 are affected by the radio waves transmitted from the equipment, and a signal strength RS of the radio signal is neither constant nor stable, as shown in FIG. 21. For this reason, a remote play prohibition state and a remote play permission state are not maintained stably in the portable terminal 30 located near a boundary of the reference strength P. Accordingly, once the reference strength P is set, the lower limit reference strength Plow for which the signal strength is set lower than that of the reference strength P is used instead for the remote play prohibition control. Specifically, the remote play is not permitted for the portable terminal 30 having the signal strength lower than the lower limit reference strength Plow (range R1), and the remote play is permitted for the portable terminal 30 having the signal strength equal to or greater than the lower limit reference strength Plow (range R2).

Specifically, when the reference strength P is set, the game device 10 automatically sets the lower limit reference strength Plow by subtracting a predetermined value from the reference strength P. Specifically, the lower limit reference strength Plow is set to be lower than the set reference strength P by a fixed width. That is, it is set to be a value lower than the reference strength P by a predetermined value, for example, the reference strength P [dBm] minus 10 [dBm]. For example, when the reference strength P is −70 [dBm], the lower limit reference strength Plow will be −80 [dBm]. It is to be noted that the lower limit reference strength Plow may not be linked to the value of the reference strength P, but may instead be set independently.

Then, the lower limit reference strength Plow is used in the remote play prohibition control as an object to be compared with the RSSI value.

The result of the comparison is used similarly to the above-described embodiment.

When the lower limit reference strength Plow, for which the signal strength is set lower than that of the reference strength P, is used for the remote play prohibition control as described above, it is possible to continue the remote play without an interruption even when the radio waves are weakened due to temporary radio wave interference or noise generation.

B-4. Prohibition Count

Figure 22:
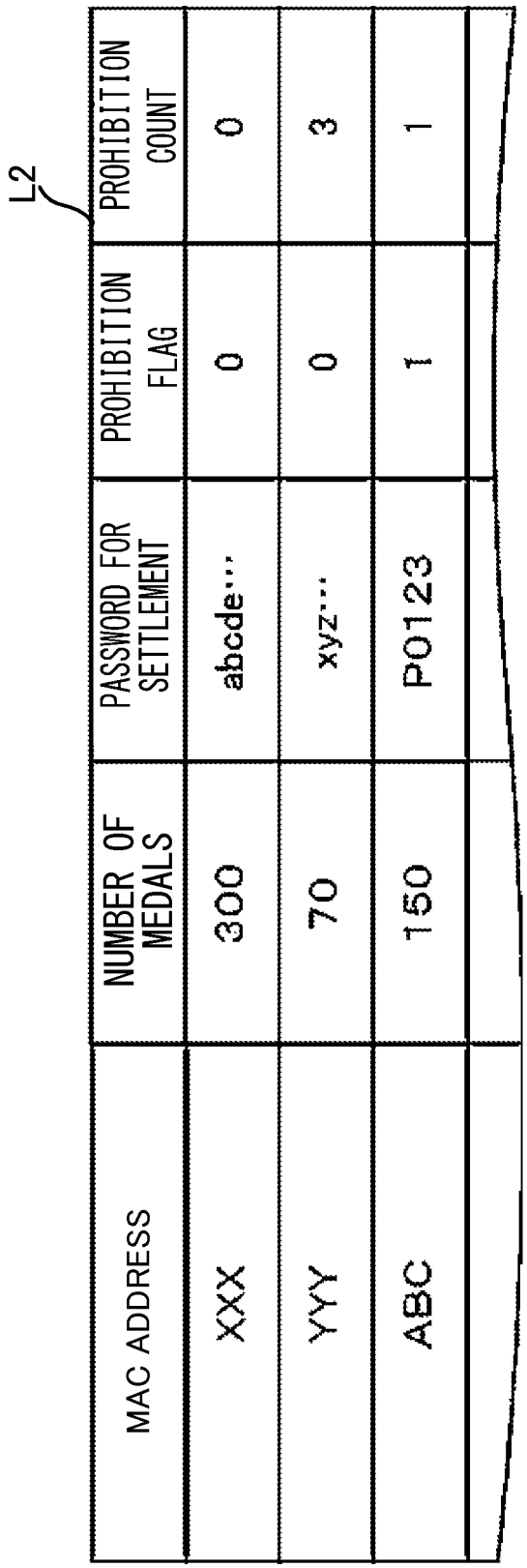
FIG. 22 is an explanatory diagram showing the updating of a prohibition count in the remote play terminal list according to the present embodiment.
Figure 23:
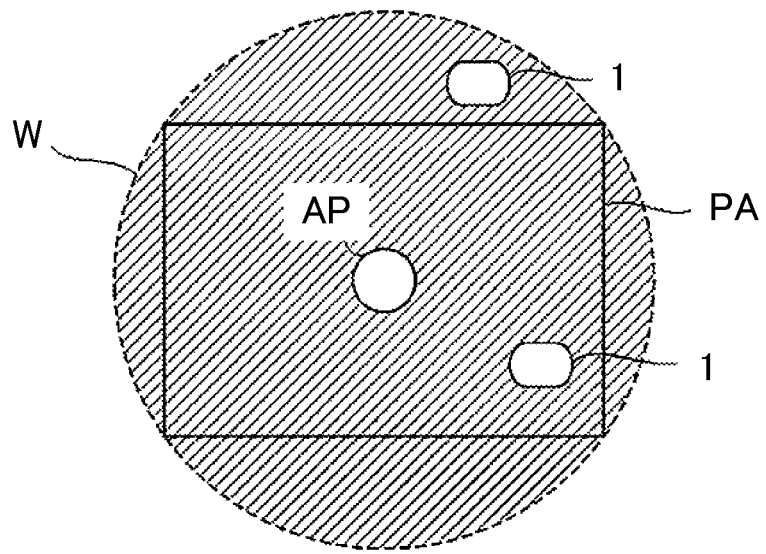
FIG. 23 is an explanatory diagram showing a conventional relationship between a radio wave coverage range and a store area.
Figure 24:
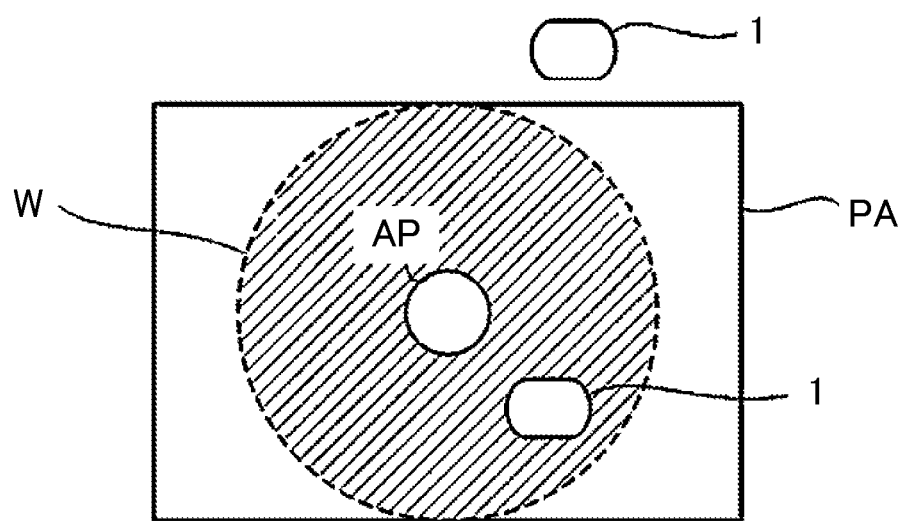
FIG. 24 is an explanatory diagram showing a conventional relationship between a radio wave coverage range and a store area.

According to the above-described embodiment, the explanation was given for a mode in which, in the remote play prohibition control, the comparison is made between the RSSI value of the portable terminal 30 and the reference strength P, and that the setting of the remote play prohibition of the portable terminal 30 is made in a case in which its RSSI value is lower than the reference strength P. However, the present invention is not limited to the above, and the remote play may be prohibited in a case in which the comparison between the RSSI value of the portable terminal 30 and the reference strength P is repeated and in which the RSSI value is lower than the reference strength P over a predetermined number of times. Specifically, as shown in FIG. 22, a prohibition count is stored in association with the MAC address in a remote play terminal list L2 stored in the storage unit 115. In the remote play prohibition control, the RSSI value of the portable terminal 30 is compared with the reference strength P, and, in a case in which the RSSI value is lower than the reference strength P and in which the prohibition flag is "0" indicating the permission, the game device 10 increments the prohibition count that is associated with the MAC address corresponding to the RSSI value by one. Next, the game device 10 checks if the prohibition count is equal to or greater than a predetermined value (for example, three or more) or not. In a case in which the prohibition count is equal to or greater than the predetermined value (for example, three or more), the remote play prohibition flag in the remote play terminal list L2 is updated from "0" indicating the permission to "1" indicating the prohibition. Meanwhile, in a case in which the prohibition count is less than the predetermined value (for example, less than three), the remote play prohibition flag is not updated. When the first connection state changes to the second connection state, the prohibition count is set to be "0" as an initial value. Furthermore, in a case in which the RSSI value is higher than the reference strength P as a result of the comparison between the RSSI value of the portable terminal 30 and the reference strength P, the prohibition count is reset to be "0".

As described above, in the remote play prohibition control, the remote play is prohibited in a case in which the RSSI value is lower than the reference strength P consecutively over the predetermined number of times, whereby it is possible to maintain the permission of the remote play even in a case in which the signal strength of the radio signal between the wireless relay device 20 and the portable terminal 30 momentarily decreases. Accordingly, the state in which the remote play is being permitted maintains stably, so that usability for the player can be improved.

B-5. Variation in Structure of Game Device 10

According to the above-described embodiment and modification example, the explanation was given to the modes of storing the remote play terminal lists L1 and L2 in the storage unit 115 of the substation 110. However, the present invention is not limited to the above, and the storage unit to store the remote play terminal lists L1 and L2 only has to be included in the game device 10, not necessarily in the substation 110.

Also, the external communication unit 116 connected to the wireless relay device 20 via wire only has to be included in the game device 10, not necessarily in the substation 110.

B-6. Variation in Unit of Reference Strength P

According to the above-described embodiment, the explanation is given of the mode of using [dBm] as the unit for the numerical values expressing the reference strength P. However, the present invention is not limited to the above, and other units may be used for the numerical values expressing the reference strength P.

For example, instead of the unit [dBm] expressed by a negative number, a unit expressed by a positive number (percentage, for example) may be used. When another unit is employed instead of the unit [dBm], the set reference strength P is converted into the unit [dBm] in the game device 10 and thereafter is compared with the RSSI value of the portable terminal 30 measured by the wireless relay device 20 in the above-described remote play prohibition control.

Thus, when the unit expressed by the positive number, instead of the unit [dBm] expressed by the negative number, is used, it is possible for the store manager to easily understand the meaning of the values intuitively when setting the reference strength P, so that the usability for the store manager can be improved.

B-7. Variation 1 in Prohibition Processing

According to the above-described embodiment, explanation was given for a mode in which the remote play is prohibited immediately after the prohibition setting is made for the portable terminal 30 to which the remote play prohibition setting is performed. However, the present invention is not limited to the above, but the remote play may be prohibited at a freely-selected timing after the prohibition setting is made.

When a series of cycles of the game that is played remotely with the portable terminal 30 is not finished, for example, the remote play permission may be maintained until the series of cycles of the game is finished even after the remote play prohibition setting is performed. Specifically, when receiving the HTTP request requesting the web page showing the progress status of the game from the portable terminal 30 (step Sc304→step Sc110 in FIG. 13), the game device 10 transmits the web page showing the progress status of the game while the series of cycles of the game is not finished even in a case in which the remote play prohibition of the portable terminal 30 is set (that is, in a case in which it is determined as NO in the step Sc111). However, the game device 10 does not perform the processing in response to the HTTP request after the series of cycles is finished. Similarly, when receiving from the portable terminal 30 the HTTP request including the operation information of the player to the portable terminal 30 (step Sc303 →step Sc110), the game device 10 reflects the operation information on the game while the series of cycles of the game is not finished even in a case in which the remote play prohibition of the portable terminal 30 is set (step Sc111: NO). However, the game device 10 does not perform any processing in response to the operation information after the series of cycles of the game is finished.

Thus, the game is not discontinued as a result of the remote play being prohibited if it is in the middle of the series of cycles of the game, and therefore, the usability for the player can be improved.

B-8. Variation 2 in Prohibition Processing

According to the above-described embodiment, the explanation was given to such a mode that, in the remote play prohibition control, the setting as to whether to prohibit or permit the remote play is made by comparing the RSSI value and the reference strength P immediately after the RSSI value corresponding to the MAC address to be determined is acquired from the wireless LAN environment information. However, the present invention is not limited to the above. The comparison between the RSSI value and the reference strength P may be performed at a different timing, and it may be configured so that the setting on the remote play prohibition or permission is not performed at the timing when the wireless LAN environment information is received.

Specifically, the game device 10, upon acquiring the RSSI value from the wireless LAN environment information, stores the value in a list, and when receiving the HTTP request requesting the web page showing the progress status of the game from the portable terminal 30 (step Sc304→step Sc110 in FIG. 13), the game device 10 acquires the RSSI value corresponding to the portable terminal 30 from the list, and determines whether or not the web page showing the progress status of the game should be transmitted based on the result of the comparison with the reference strength P. Similarly, when receiving from the portable terminal 30 the HTTP request including the operation information of the player to the portable terminal 30 (step Sc303→step Sc 110), the game device 10 acquires the RSSI value corresponding to the portable terminal 30 from the list and determines whether or not the operation information should be reflected in the game, based on the result of the comparison with the reference strength P.

B-9. Variation in Structure of Game System GS According to the above-described embodiment, explanation was given for the mode of connecting the game device 10 and the wireless relay device 20 via wire. However, the present invention is not limited to the above, and it may be configured so that the game device 10 and the wireless relay device 20 are connected wirelessly.

In this case, the game device 10 has the wireless LAN function, and between the external communication unit 116 and the wireless communication unit 201 of the wireless relay device 20 is connected wirelessly.

B-10. Variation in Structure of Game System GS

According to the above-described embodiment, the game device 10 performs the remote play prohibition control processing for the registered portable terminal 30 by using the reference strength P, after performing the series of procedures causing the portable terminal 30 to shift from the first connection state to the second connection state. However, the present invention is not limited to this mode. Instead, the remote play may be permitted for the portable terminal 30 that is registered by the series of procedures causing the portable terminal 30 to shift from the first connection state to the second connection state.

Specifically, the game device 10A (not shown) of this modification example is a game device 10 at which the game play at the portable terminals 30 is possible by the game device 10A connecting to the wireless relay device 20 capable of performing wireless communication with the plurality of portable terminals 30. The game device 10A has a connection response unit (Sb207 and Sb208 in FIG. 5) that makes a connection response to the portable terminal 30 (connection requesting portable terminal) having made a connection request, out of the portable terminals 30, a connection confirmation reception unit (Sb210 in FIG. 5) that receives connection confirmation operation of the player, a registration unit (Sb211 in FIG. 5) that registers, with a registration list, identification information corresponding to the portable terminal 30 (connection requesting portable terminal) that receives the connection confirmation operation, and a game permission control unit (Sc111 to Sc114 in FIG. 13) that permits the game play at the registered portable terminal for which the identification information is registered with the registration list. Thus, the game device 10A sends the connection response to the portable terminal 30 from which the connection request is received, and registers the portable terminal 30 with the registration list at the discretion of the player owing the portable terminal 30 receiving the connection confirmation. This eliminates the need for complicated procedures such as inputting of the MAC address of the portable terminal 30 separately, when registering the portable terminal 30 with the registration list.

Moreover, the game device 10A additionally has a determination unit (Sc106 to Sc108 in FIG. 13) that determines a communication status between the wireless relay device 20 and the respective portable terminals 30 connected wirelessly thereto. The game permission control unit assigns (sets) disabling information (prohibition flag) disabling the permission of the game play to the identification information corresponding to the registered portable terminal that is determined to be in a poor communication state by the determination unit, so as to prohibit the game play at the registered portable terminal. When it is determined to be in a good communication state again by the determination unit, the disabling information may be cancelled (the prohibition flag is reset), thereby to permit the game play at the registered portable terminal. Thus, the disabling information disabling the permission of the game play that is assigned to the identification information of the portable terminal 30, for which the signal strength of the radio signal is determined not to reach the predetermined reference strength P, is maintained for the portable terminal registered in the registration list, and therefore, switching permission and prohibition of the game play by the portable terminal 30 can be made while maintaining the registration of the portable terminal 30 with the registration list, by updating the maintained disabling information. Because it is not necessary to delete the portable terminal from the registration list in order to disable the permission of the game play, it is not necessary to perform the registration procedures again even though the permission of the game play has been once disabled. The determination in the determination unit may be performed by determining the communication state by using the reference strength P as in the above-described embodiment, or by determining the communication state depending on whether the communication is possible or not.

B-11. Other Modification Example

According to the respective stations 130 of the game device 10, the medals are dispensed from the medal processing unit (not shown), but tickets (which may also be referred to as "coupons") may be dispensed instead of the medals.

DESCRIPTION OF THE REFERENCE NUMERALS

GS Game system
L1, L2 Remote play terminal lists (registration lists)
10 Game device
110 Substation 111 Control unit
112 Medal processing unit
113 Display unit
114 Operation unit
115 Storage unit
116 External communication unit
120 Main control section
121 Control unit
122 Game control unit
123 Station communication unit
124 Substation communication unit
130 Station
20 Wireless relay device
201 Wireless communication unit
202 Wired communication unit
203 Control unit
30 Portable terminal
301 Display unit
302 Operation unit
303 Wireless communication unit
304 Control unit

The invention claimed is:

1. A game device connected with a plurality of portable terminals via a wireless relay device capable of communicating wirelessly with the plurality of portable terminals, the game device comprising:
   (a) a computer storage storing identification information of a plurality of portable terminals registered with the game device;
   (b) a computer processor at the game device, the computer processor coupled to the computer storage and programmed to:
   transmit a connection response to a connection requesting portable terminal that has transmitted a connection request;
   receive a connection confirmation operation of a player;
   receive an input of credit information indicating the number of credits that can be consumed in the game play;
   register in the computer storage, along with a registration list, identification information corresponding to the connection requesting portable terminal for which the input of the credit information has been received;
   receive network environment information from the wireless relay device;
   analyze and extract a signal strength value for each of the plurality of portable terminals;
   determine, for each of the plurality of portable terminals, whether or not the signal strength value is less than a predetermined reference value;
   receive a request from a first portable terminal, among the plurality of portable terminals, to perform a game play operation;
   access the computer storage and retrieve the registration list;
   prohibit performance of the requested game play operation when the identification information of the first portable terminal is not registered with the registration list and when it is determined that the signal strength value of the first portable terminal is less than the predetermined reference value; and
   permit the performance of the requested game play operation when the identification information of the first portable terminal is registered with the registration list and if it is determined that the signal strength value of the first portable terminal is greater than or equal to the predetermined reference value.

2. The game device according to claim 1, wherein the computer processor is further programmed to:
   register in the computer storage, along with the registration list, identification information corresponding to the connection requesting portable terminal when the number of credits indicated by the credit information of the connection requesting portable terminal is equal to or greater than a predefined minimum credit number.

3. The game device according to claim 2,
   wherein the computer processor prohibits the performance of the requested game play operation of the first portable terminal by assigning disabling information to disable the permission of the performance of the requested game play operation of the first portable terminal to the identification information corresponding to the first portable terminal in a case in which it is determined that the signal strength value of the first portable terminal is below the predetermined reference strength, and
   wherein the computer processor cancels the disabling information to permit the performance of the requested game play operation at the first portable terminal in a case in which it is again determined that the signal strength value of the first portable terminal is equal to or greater than the predetermined reference value.

4. The game device according to claim 1,
   wherein the wireless relay device is formed by a plurality of separate wireless relay devices,
   wherein the game device is capable of establishing a communication connection with the plurality of separate wireless relay devices; and
   wherein the predetermined reference value is separately set for each of the plurality of separate wireless relay devices.

5. The game device according to claim 1, wherein, in a case in which an instruction for the performance of the requested game play operation is received from the first portable terminal for which the performance of the requested game play operation is prohibited, the computer processor notifies the first portable terminal that the performance of the requested game play operation is prohibited.

6. The game device according to claim 1, wherein the computer processor is further programmed to:
   generate a lower limit reference value based on the predetermined reference value;
      determine whether or not the signal strength value of each of the plurality of portable terminals is less than the lower limit reference value; and permit the performance of the requested game play operation when the identification information of the first portable terminal is registered with the registration list and if it is determined that the signal strength value of the first portable terminal is greater than or equal to the lower limit reference value.

7. The game device according to claim 1, wherein the computer processor is further programmed to:
   calculate a prohibition count for each of the plurality of portable terminals, by accumulating a number of times the signal strength value is determined as being less than the predetermined reference value for the respective portable terminal; and
   prohibit progress of the performance of the requested game play operation for the first device when the prohibition count is equal to or greater than a reference threshold count value.

* * * * *